United States Patent
Chen et al.

(10) Patent No.: US 9,008,181 B2
(45) Date of Patent: Apr. 14, 2015

(54) SINGLE REFERENCE PICTURE LIST UTILIZATION FOR INTERPREDICTION VIDEO CODING

(75) Inventors: Peisong Chen, San Diego, CA (US); Wei-Jung Chien, San Diego, CA (US); Marta Karczewicz, San Diego, CA (US); Ying Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 383 days.

(21) Appl. No.: 13/353,625

(22) Filed: Jan. 19, 2012

(65) Prior Publication Data

US 2012/0189058 A1 Jul. 26, 2012

Related U.S. Application Data

(60) Provisional application No. 61/435,496, filed on Jan. 24, 2011, provisional application No. 61/445,476, filed on Feb. 22, 2011, provisional application No. 61/450,550, filed on Mar. 8, 2011.

(51) Int. Cl.
| | |
|---|---|
| *H04N 11/02* | (2006.01) |
| *H04N 19/577* | (2014.01) |
| *H04N 19/159* | (2014.01) |
| *H04N 19/176* | (2014.01) |
| *H04N 19/46* | (2014.01) |
| *H04N 19/61* | (2014.01) |
| *H04N 19/109* | (2014.01) |
| *H04N 19/174* | (2014.01) |
| *H04N 19/17* | (2014.01) |

(52) U.S. Cl.
CPC .......... *H04N 19/577* (2014.11); *H04N 19/159* (2014.11); *H04N 19/176* (2014.11); *H04N 19/46* (2014.11); *H04N 19/61* (2014.11); *H04N 19/109* (2014.11); *H04N 19/174* (2014.11); *H04N 19/17* (2014.11)

(58) Field of Classification Search
USPC ........................................ 375/240.01–240.29
See application file for complete search history.

(56) References Cited

U.S. PATENT DOCUMENTS

| 7,233,621 B2 | 6/2007 | Jeon | |
| 7,515,637 B2 * | 4/2009 | Payson | ..................... 375/240.16 |

(Continued)

FOREIGN PATENT DOCUMENTS

| WO | WO2006040413 A1 | 4/2006 |
| WO | WO2011075096 A1 | 6/2011 |

OTHER PUBLICATIONS

International Search Report and Written Opinion—PCT/US2012/022102—ISA/EPO—May 14, 2012.

(Continued)

*Primary Examiner* — Dave Czekaj
*Assistant Examiner* — Leron Beck
(74) *Attorney, Agent, or Firm* — Shumaker & Sieffert, P.A.

(57) ABSTRACT

The example techniques described in this disclosure provide for an efficient manner to encode or decode a video block of a picture using a single reference picture list. The single reference picture list may include identifiers for reference picture or pictures used to encode or decode the video block. In some examples, a video encoder or decoder may encode or decode a video block that is predicted from two reference pictures using the single reference picture list, and encode or decode a video block that is predicted from one reference picture using the same, single reference picture list.

39 Claims, 7 Drawing Sheets

(56) References Cited

U.S. PATENT DOCUMENTS

| | | | |
|---|---|---|---|
| 2006/0133488 A1* | 6/2006 | Park et al. | 375/240.12 |
| 2006/0291562 A1 | 12/2006 | Lee et al. | |
| 2008/0101474 A1* | 5/2008 | Chiu et al. | 375/240.24 |
| 2009/0116558 A1* | 5/2009 | Chen et al. | 375/240.16 |
| 2009/0262804 A1* | 10/2009 | Pandit et al. | 375/240.12 |
| 2010/0008419 A1 | 1/2010 | Wu et al. | |
| 2010/0074334 A1 | 3/2010 | Jeon et al. | |
| 2010/0296579 A1 | 11/2010 | Panchal et al. | |
| 2012/0250765 A1* | 10/2012 | Wu et al. | 375/240.12 |

OTHER PUBLICATIONS

Li, B. et al., "Redundancy reduction in B-frame coding at temporal level zero", Joint Collaborative Team on Video Coding, No. JCTVC-C278, Oct. 7-15, 2010, 6 pp.

Richardson, I. "Frame and picture management", Internet Citation, 2004, Retrieved from the Internet: URL: http://www.rgu.ac.uk/files/avc_picmanagement_draft1.pdf [retrieved on May 29, 2007], 7 pp. (in accordance with MPEP § 609.04(a), Applicant points out that the 2004 year of publication is sufficiently earlier than the effective U.S. filed and any foreign priority date.).

Suzuki, Y. et al., "Extension of uni-prediction simplification in B slices", Joint Collaborative Team on Video Coding, No. JCTVC-D421, Jan. 20-28, 2011, 7 pp.

Chen Y et al.,"Comments on Generalized P and B Pictures", 4.JCT-VC Meeting; 95. MPEG Meeting; Jan. 20, 2011-Jan. 28, 2011; Daegu ; (Joint Collaborative Team on Video Coding of ISO/IEC JTC1/SC29/WG11AND ITU-T SG.16); URL: http://wftp3.itu.int/av-arch/jctvc-site/, No. JCTVC-D401, Jan. 16, 2011, 4 pp.

International Preliminary Report on Patentability—PCT/US2012/022102, The International Bureau of WIPO—Geneva, Switzerland, Mar. 27, 2013, 31 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Second Written Opinion of international application No. PCT/US2012/022102, dated Dec. 21, 2012, 7 pp.

Bross, B. et al.,"WD5: Working Draft 5 of High-Efficiency Video Coding," Joint Collaborative Team on Video Coding, Document: JCTVC-G1103_d2, Nov. 21-30, 2011, 214 pp.

Bross, B. et al., "High efficiency video coding (HEVC) text specification draft 6" Joint Collaborative Team on Video Coding, Document: JCTVC-H1003, Nov. 21-30, 2011, 259 pp.

Bross, B. et al., "WD4: Working Draft 4 of High-Efficiency Video Coding," Joint Collaborative Team on Video Coding, Document: JCTVC-F803_d2, Jul. 14-22, 2011, 226 pp.

Flierl, M. et al., "Generalized B Pictures and the Draft H.264/AVC Video-Compression Standard," IEEE Transactions on Circuits and Systems for Video Technology, vol. 13, No. 7, Jul. 2003, 11 pp.

Anonymous, "Advanced video coding for generic audiovisual services," International Telecommunication Union-Telecommunication Standardization Sector, H.264, Mar. 2010, 669 pp.

Wiegand, T. et al.,"WD1: Working Draft 1 of High-Efficiency Video Coding," Joint Collaborative Team on Video Coding, Document: JCTVC-C403, Oct. 7-15, 2010, 137 pp.

Tourapis, A. et al., "Motion Vector Prediction With Reference Frame Consideration," Proceedings of the SPIE, Applications of Digital Image Processing XXVI, vol. 5203, Nov. 19, 2003, 8 pp.

Wiegand, T. et al., "WD2: Working Draft 2 of High-Efficiency Video Coding," Joint Collaborative Team on Video Coding, Document: JCTVC-D503, Jan. 20-28, 2011, 153 pp.

Wiegand, T. et al., "WD3: Working Draft 3 of High-Efficiency Video Coding," Joint Collaborative Team on Video Coding, Document: JCTVC-E603, Mar. 16-23, 2011, 193 pp.

* cited by examiner

SINGLE REFERENCE PICTURE LIST UTILIZATION FOR INTERPREDICTION VIDEO CODING

This application claims the benefit of U.S. Provisional Application No. 61/435,496, filed Jan. 24, 2011, U.S. Provisional Application No. 61/445,476, filed Feb. 22, 2011, and U.S. Provisional Application No. 61/450,550, filed Mar. 8, 2011, the contents of each is hereby incorporated by reference in its respective entirety.

TECHNICAL FIELD

This disclosure relates to video coding and, more particularly, video inter-coding techniques.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), or the emerging High Efficiency Video Coding (HEVC) standard, and extensions of such standards, to transmit and receive digital video information more efficiently.

Video compression techniques perform spatial prediction and/or temporal prediction to reduce or remove redundancy inherent in video sequences. For block-based video coding, a video picture or slice may be partitioned into video blocks or coding units (CUs). Video blocks in an intra-coded (I) slice are encoded using spatial prediction with respect to neighboring blocks in the same picture. Video blocks in an inter-coded (P or B) slice may use spatial prediction with respect to neighboring blocks in the same picture or temporal prediction with respect to other reference pictures. Video coding devices store lists of reference pictures in memory for use during inter-picture coding. The list of reference pictures with display times before the currently coded picture is referred to as List 0, while the list of reference pictures with display times after the current coded picture is referred to as List 1.

Video blocks in a P slice may be encoded using uni-direction prediction with a single motion vector pointing to a past reference picture in List 0. Video blocks in a B slice may be encoded using (a) uni-direction prediction with a single motion vector pointing to a past reference picture in List 0, (b) uni-directional prediction with a single motion vector pointing to a future reference picture in List 1, (c) or bi-prediction with two motion vectors pointing to past and future reference pictures in List 0 and List 1, respectively. The P and B slice classifications have since been expanded to include a generalized P/B (GPB) slice in which video blocks are encoded as a B slice, except List 0 and List 1 may include reference pictures in the same temporal direction or different temporal directions. In one specific example of a GPB slice, List 0 and List 1 may be identical.

Syntax elements defined to indicate reference picture list information are encoded and signaled to a decoding device in a slice header of a coded video slice. Upon receipt of the coded video slice and its associated syntax elements, the decoder performs reference picture list construction for List 0 and List 1 based on the syntax elements. For a B slice, each coded video block may have an associated syntax element, i.e., inter_pred_idc, to indicate whether the video block is bi-predicted (Bi), uni-directionally predicted in the forward direction from List 0 (Pred_L0), or uni-directionally predicted in the backward direction from List 1 (Pred_L1). The inter_pred_idc syntax element for a B slice, therefore, consumes two bits to indicate one of the three statuses: Bi, Pred_L0, or Pred_L1.

SUMMARY

In general, this disclosure relates to techniques for constructing a single reference picture list with which a video coder may code a video block of a video picture regardless of whether the video block is inter-coded using bi-prediction or uni-directional prediction. For instance, with only the single reference picture list, a video coder may code a video block using bi-prediction with respect to two reference pictures both included in the single reference picture list. The reference pictures in the single reference picture list may be all temporally prior, temporally subsequent, or both temporally prior and subsequent to the current picture. In some examples, the video coder may also code information that indicates whether coding of all video blocks in a video sequence, a video picture, or a video slice is limited to uni-directional prediction with respect to only one reference picture, which may result in implementation of less complex coding techniques.

Each coded video block of the video picture may have an associated syntax element to indicate whether the video block is bi-predicted from the single reference picture list (Bi) or uni-directionally predicted from the single reference picture list (Uni). The techniques, therefore, result in reducing a cost of coding inter-prediction status for video blocks in video pictures regardless of whether the video blocks are bi-predicted or uni-directionally predicted. For instance, because only the single reference picture list may be needed to inter-code both bi-predicted and uni-directionally predicted video blocks, constructions of multiple reference picture lists (e.g., the conventional List 0 and List 1) may not be needed, which may reduce the amount of needed computation resources. Furthermore, in this way, the video coder may not need to specify whether a uni-directionally predicted video block is predicted with respect to List 0 or List 1 (e.g., the conventional syntax elements Pred_L0 and Pred_L1), which may reduce the amount of syntax elements that need to be signaled, because only the single reference picture list, and no additional reference picture list, may be needed to inter-code the uni-directionally predicted video block.

In one example, the disclosure describes a method of coding video data that includes constructing, with a video coder, a single reference picture list that includes an identifier for each of one or more reference pictures from a memory that stores decoded reference pictures. The method also include coding, with the video coder, a video block of a current picture using one of bi-prediction with respect to two of the reference pictures identified in the single reference picture list, and uni-directional prediction with respect to one of the reference pictures identified in the single reference picture list.

In another example, the disclosure describes a video coding device that includes a memory operable to store decoded reference pictures. The video coding device also includes a video coder operable to construct a single reference picture list that includes an identifier for each of one or more reference pictures stored in the memory. The video coder is also operable to code a video block of a current picture using one of bi-prediction with respect to two of the reference pictures identified in the single reference picture list, and uni-directional prediction with respect to one of the reference pictures identified in the single reference picture list.

In another example, the disclosure describes a video coding device that includes means for constructing a single reference picture list that includes an identifier for each of one or more reference pictures from a memory that stores decoded reference pictures. The video coding device also includes means for coding a video block of a current picture using one of bi-prediction with respect to two of the reference pictures identified in the single reference picture list, and uni-directional prediction with respect to one of the reference pictures identified in the single reference picture list.

In another example, the disclosure describes a computer-readable storage medium comprising instructions for coding video data that, upon execution in a video coder, cause the video coder to construct a single reference picture list that includes an identifier for each of one or more reference pictures from a memory that stores decoded reference pictures, and code a video block of a current picture using one of bi-prediction with respect to two of the reference pictures identified in the single reference picture list, and uni-directional prediction with respect to one of the reference pictures identified in the single reference picture list.

The details of one or more examples are set forth in the accompanying drawings and the description below. Other features, objects, and advantages will be apparent from the description and drawings, and from the claims.

DETAILED DESCRIPTION

Figure 1:
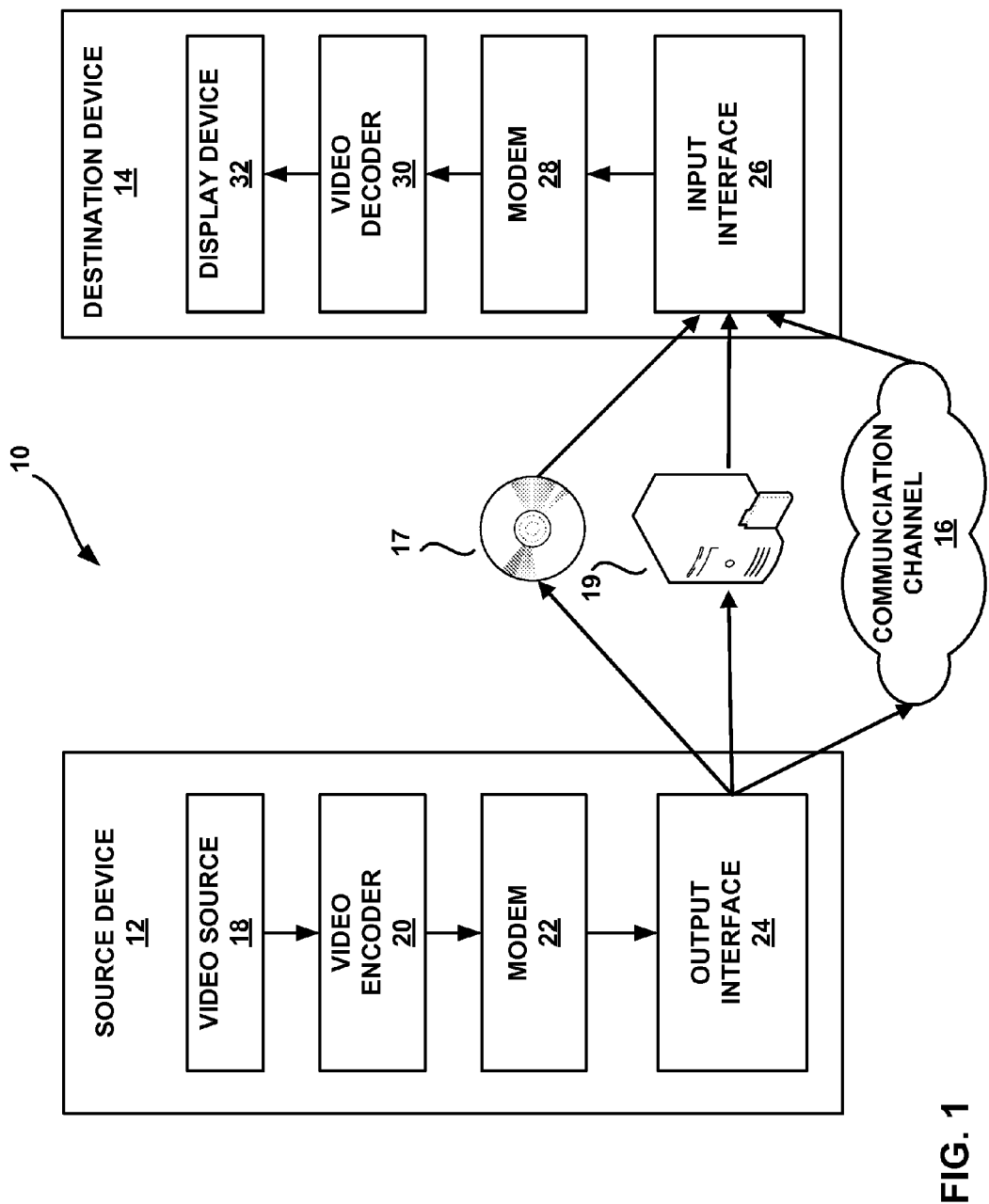
FIG. 1 is a block diagram illustrating an example video encoding and decoding system that may utilize techniques for efficiently coding and constructing a single reference picture list for both bi-prediction and uni-directional prediction of video blocks.

This disclosure describes example techniques to code, e.g., decode or encode, a video block of a slice using either bi-prediction or uni-directional prediction with respect to reference pictures in only a single reference picture list. For example, a video coder may code video blocks of a B-slice using bi-prediction with two motion vectors pointing to one or two reference pictures included in the same single reference picture list. In some examples, each of the two motion vectors may point to a same reference picture. In some other examples, each of the two motion vectors may point to two different reference pictures. For purposes of brevity, many of the examples are described where the two motion vectors point to two different reference pictures; however, aspects of this disclosure are not so limited.

The video coder may code video blocks of a B-slice or a P-slice using uni-directional prediction with one motion vector pointing to one reference picture included in the single reference picture list. Similarly, the video coder may code video blocks of a generalize P/B (GPB) slice using one or two reference pictures included in the single reference picture list.

In accordance to one or more example techniques described in this disclosure, the video coder may utilize only the single reference picture list to code a video block when that video block is coded with respect to two motion vectors (e.g., bi-predicted with respect to one or two reference pictures) or when that video block is coded with respect to one motion vector (e.g., uni-directionally predicted with one reference picture) regardless of whether the video block is of a B-slice, a P-slice, or a GPB slice. In other words, a video coder, e.g., a video encoder or video decoder, may construct a single reference list to code, e.g., encode or decode, video blocks of all types of inter-coded video slices. According to one or more of these example techniques, no other reference picture lists are required for coding the video blocks regardless of whether the video blocks are bi-predicted or uni-directionally predicted (e.g., bi-predicted or uni-directionally predicted B-slices, uni-directionally predicted P-slices, or bi-predicted or uni-directionally predicted GPB-slices).

The term "slice" as used in this disclosure refers to a portion of a picture, but may encompass the entirety of the picture. The term "picture" as used in this disclosure refers to an instance of video content. For example, rapid display of sequential pictures results in smooth video playback. In some portions, the term "picture" may be used interchangeably with the term "frame."

The single reference picture list includes identifiers that identify the reference picture or pictures that are used to code a video block of a slice. These reference pictures may be stored in a memory of a video coding device. The identifiers for the reference picture or pictures may be picture order count (POC) values and/or picture number values assigned to the reference picture. The POC values may indicate the display order of the pictures in a video sequence or group of pictures (GOP). The picture number values may indicate the coding order of the pictures in the video sequence or GOP. As one example, a picture with a smaller POC value compared to another picture is displayed earlier, but is not necessarily coded earlier. A picture with a smaller picture number value compared to another picture is coded earlier, but is not necessarily displayed earlier. The reference pictures may be organized in the single reference picture list based on the temporal distance of the reference pictures from the current picture. The temporal distance may be defined, for example, as a difference between POC values and/or picture number values of a given reference picture and the picture currently being encoded.

As one example, the video coder may utilize the single reference picture list to predict a video block of a P-slice or to uni-directionally predict a video block of a B-slice or GPB slice that is coded with respect to only one reference picture. The video coder may also utilize the same, single reference picture list to bi-predict a B-slice that is coded with respect to two different reference pictures. In this instance, both of the two different reference pictures are identified in the single reference picture list. This may increase the similarity in the manner in which the video coder processes a P slice, a B slice, and/or a GPB slice, thereby increasing the processing efficiency of the video coder. In other words, the video coder may not need to construct more than one reference picture list to code video blocks of any type of inter-coded slice when the video blocks are coded with respect to one or two reference pictures.

In one or more of the example techniques described in this disclosure, the video coder may not need to indicate, or otherwise recognize (e.g., determine), that an inter-coded slice is a P-slice, a B-slice or even a GPB-slice because the video blocks of these slice types may each be coded with reference picture(s) identified in only one reference picture list (e.g., the single reference picture list). This may result in a reduction of the amount of information that needs to be coded. For instance, the video encoder may not need to encode syntax information that indicates a specific type of inter-coded slice, and the video decoder may not need to decode information that indicates a specific type of inter-coded slice because video blocks in all the types of inter-coded slices are coded with respect to the same, single reference picture list, and also coded with respect to the same, single reference picture list regardless of the number of reference pictures that are used to predict the video blocks.

In some examples, the video decoder may implement a default construction technique to construct the single reference picture list. The default construction technique to construct the single reference picture list refers to a set, defined way in which the video decoder constructs the single reference picture list. In general, the video decoder may implement the default construction technique to construct the single reference picture list without receiving coding instructions signaled by the video encoder.

The default construction technique to construct the single reference picture list may be based, generally, on temporal distances between the reference pictures that are used to code video blocks of the current picture and the current picture. As one example, the temporal distance between the reference pictures and the current picture may be the difference in presentation time. As described above, each picture may be assigned with a picture order count (POC) value that indicates the order in which the pictures are displayed, i.e., presented, and the difference in presentation time may be the difference in the POC values of the reference picture or pictures and the current picture.

As another example, the temporal distance between reference pictures and the current picture may be the difference in coding time. As described above, each picture may be assigned a picture number value that indicates the order in which the pictures are coded, e.g., decoded, and the difference in the coding time may be the difference in the picture number values of the reference picture or pictures and the current picture. For purposes of illustration and clarity, the techniques of this disclosure are described in context where the temporal distances are the difference in presentation time. However, aspects of this disclosure are not so limited, and the temporal distances may be the difference in coding time (e.g., decoding time).

As part of the default construction technique, the video decoder may include identifiers for the reference pictures in the single reference picture list based on the temporal distances of the reference pictures to the current picture. The identifiers for the reference pictures may be the POC values of the reference pictures, or the picture number values. In instances where the temporal distances between two reference pictures and the current picture are identical, the default construction technique may define which one of the two reference pictures should be included in the single reference picture list before the other reference picture, as described in more detail below.

The default construction technique to construct the single reference picture list may further reduce the amount of information that is coded. For example, with the default construction technique, the video decoder may not need to decode information that indicates the manner in which to construct the single reference picture list. Rather, the video decoder may be programmed, or otherwise, configured to implement the default construction technique which may not rely on reception of information that explicitly indicates how to construct the single reference picture list, such as each reference picture to be added in each entry of the single reference picture list. In this way, the video encoder may not need to signal syntax information that instructs the video decoder in the manner in which the video decoder should construct the single reference picture list.

To reduce the amount of information that is coded, in some examples, the video encoder may encode a syntax element that indicates whether a slice of a picture, the entirety of the picture, or a set of pictures is restricted to uni-directional predictive coding. Uni-directional predictive coding means coding with respect to only one reference picture. As described in more detail, the syntax element that indicates that coding is restricted to uni-directional predictive coding is referred to as the uni_pred_only syntax element.

As one example, each video block of an inter-coded slice may be coded with respect to one reference picture or two reference pictures. When all video blocks in a given slice are coded with respect to one reference picture, the video encoder may encode the uni_pred_only syntax element to indicate that the slice, regardless of whether the slice is a P-slice, B-slice, or GPB slice, is coded with respect to only one reference picture. The video decoder may decode the uni_pred_only syntax element to recognize (e.g., determine) that all video blocks in the current slice are encoded with respect to only one reference picture.

In this example, for each video block in the current slice, the video decoder may expect to decode syntax elements that indicate a single reference picture in the single reference picture list that was used to encode the video block, and would not necessarily need to wait for additional syntax elements that indicate whether any other reference picture was used to encode the video block. In this manner, the syntax element that indicates that coding is restricted to uni-directional predictive coding may further promote similarities in the manner in which the video decoder processes all inter-coded slices, as well as further promote computational efficiency of the video decoder (e.g., lower the complexity associated with decoding the slice).

The video encoder may signal this new syntax element (e.g., the uni_pred_only syntax element) in a header appended to each slice that indicates whether prediction is limited to uni-directional predictive coding. While described as being embedded in the slice header, this new syntax element may be embedded in separately signaled parameter sets, such as a picture parameter set (PPS) or a sequence parameter set (SPS).

When coding is restricted to uni-directional predictive coding, the video coder may code the uni_pred_only syntax element with a value equal to 1 to indicate "true," which means that the video blocks in the slice are only uni-directionally predicted. Otherwise, the video coder may code the uni_pred_only syntax element with a value equal to 0 to indicate "false," which means that the video blocks in the slice may be bi-predicted or uni-directionally predicted, or not code the uni_pred_only syntax element at all.

In instances where the coding is not restricted to uni-directional predictive coding, the video encoder may also signal information that indicates a percentage of blocks of a slice that are encoded using bi-prediction with respect to one or two reference pictures. In some examples, in addition to or instead of signaling information that indicates a percentage of blocks of a slice that are encoded using bi-prediction, the video encoder may signal information that indicates a percentage of area within the slice that is encoded using bi-prediction. The information that indicates a percentage of blocks of a slice that are bi-predicted or a percentage of area of a slice that is bi-predicted may be embedded in the slice header, embedded separately in the PPS or SPS, or embedded in level definitions, such that a decoder confirming to a lower level may have less percent of coding units (CUs) using bi-prediction, thus requires less decoding computations.

FIG. 1 is a block diagram illustrating an example video encoding and decoding system 10 that may utilize techniques for efficient coding and constructing a single reference picture list for both bi-prediction and uni-directional prediction of video blocks in accordance with examples of this disclosure. In general, the single reference picture list may be alternatively referred to as a single reference frame list. As shown in FIG. 1, system 10 includes a source device 12 that generates encoded video for decoding by destination device 14. Source device 12 and destination device 14 may each be an example of a video coding device. Source device 12 may transmit the encoded video to destination device 14 via communication channel 16 or may store the encoded video on a storage medium 17 or a file server 19, such that the encoded video may be accessed by the destination device 14 as desired.

Source device 12 and destination device 14 may comprise any of a wide variety of devices, including desktop computers, notebook (i.e., laptop) computers, tablet computers, set-top boxes, telephone handsets such as so-called smartphones, televisions, cameras, display devices, digital media players, video gaming consoles, or the like. In many cases, such devices may be equipped for wireless communication. Hence, communication channel 16 may comprise a wireless channel, a wired channel, or a combination of wireless and wired channels suitable for transmission of encoded video data. Similarly, the file server 19 may be accessed by the destination device 14 through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server.

Techniques for constructing a single reference picture list to code video blocks of any type of a slice, in accordance with examples of this disclosure, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20, a modulator/demodulator (modem) 22 and an output interface 24. In source device 12, video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video information may be modulated by modem 22 according to a communication standard, such as a wireless communication protocol, and transmitted to destination device 14 via output interface 24. Modem 22 may include various mixers, filters, amplifiers or other components designed for signal modulation. Output interface 24 may include circuits designed for transmitting data, including amplifiers, filters, and one or more antennas.

The captured, pre-captured, or computer-generated video that is encoded by the video encoder 20 may also be stored onto a storage medium 17 or a file server 19 for later consumption. The storage medium 17 may include Blu-ray discs, DVDs, CD-ROMs, flash memory, or any other suitable digital storage media for storing encoded video. The encoded video stored on the storage medium 17 may then be accessed by destination device 14 for decoding and playback.

File server 19 may be any type of server capable of storing encoded video and transmitting that encoded video to the destination device 14. Example file servers include a web server (e.g., for a website), an FTP server, network attached storage (NAS) devices, a local disk drive, or any other type of device capable of storing encoded video data and transmitting it to a destination device. The transmission of encoded video data from the file server 19 may be a streaming transmission, a download transmission, or a combination of both. The file server 19 may be accessed by the destination device 14 through any standard data connection, including an Internet connection. This may include a wireless channel (e.g., a Wi-Fi connection), a wired connection (e.g., DSL, cable modem, Ethernet, USB, etc.), or a combination of both that is suitable for accessing encoded video data stored on a file server.

Destination device 14, in the example of FIG. 1, includes an input interface 26, a modem 28, a video decoder 30, and a display device 32. Input interface 26 of destination device 14 receives information over channel 16, and modem 28 demodulates the information to produce a demodulated bitstream for video decoder 30. The demodulated bitstream may include a variety of syntax information generated by video encoder 20 for use by video decoder 30 in decoding video data. Such syntax may also be included with the encoded video data stored on a storage medium 17 or a file server 19. As one example, the syntax may be embedded with the encoded video data, although aspects of this disclosure should not be considered limited to such a requirement. The syntax information defined by video encoder 20, which is also used by video decoder 30, may include syntax elements that describe characteristics and/or processing of prediction units (PUs), coding units (CUs) or other units of coded video, e.g., video slices, video pictures, and video sequences or groups of pictures (GOPs). Each of video encoder 20 and video decoder 30 may form part of a respective encoder-decoder (CODEC) that is capable of encoding or decoding video data.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the emerging High Efficiency Video Coding (HEVC) standard or the ITU-T H.264 standard, alternatively referred to as MPEG-4, Part 10, Advanced Video Coding (AVC). The HEVC standard is currently under development by the ITU-T/ISO/IEC Joint Collaborative Team on Video Coding (JCT-VC). The techniques of this disclosure, however, are not limited to any particular coding standard. Other examples include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure.

Each of video encoder 20 and video decoder 30 may be included in one or more encoders or decoders, either of which may be integrated as part of a combined encoder/decoder (CODEC) in a respective device. In some instances, video encoder 20 and video decoder 30 may be commonly referred to as a video coder that codes information (e.g., pictures and syntax elements). The coding of information may refer to encoding when the video coder corresponds to video encoder 20. The coding of information may refer to decoding when the video coder corresponds to video decoder 30.

Furthermore, the techniques described in this disclosure may refer to video encoder 20 signaling information such as syntax elements. When video encoder 20 signals information, the techniques of this disclosure generally refer to any manner in which video encoder 20 provides the information. For example, when video encoder 20 signals syntax elements to video decoder 30, it may mean that video encoder 20 transmitted the syntax elements to video decoder 30 via output interface 24 and communication channel 16, or that video encoder 20 stored the syntax elements via output interface 24 on storage medium 17 and/or file server 19 for eventual reception by video decoder 30. In this way, signaling from video encoder 20 to video decoder 30 should not be interpreted as requiring transmission from video encoder 20 that is immediately received by video decoder 30, although this may be possible. Rather, signaling from video encoder 20 to video decoder 30 should be interpreted as any technique with which video encoder 20 provides information for eventual reception by video decoder 30.

In the examples of this disclosure, video encoder 20 may encode a portion of a picture of the video data, referred to as a video block, using intra-prediction or inter-prediction. The video block may be portion of a slice, which may be a portion of the picture. For purposes of illustration, the example techniques described in this disclosure are generally described with respect to video blocks of slices. For instance, an intra-predicted video block of a slice means that the video block within the slice is intra-predicted (e.g., predicted with respect to neighboring blocks within the slice or picture that includes the slice). Similarly, an inter-predicted video block of a slice means that the video block within the slice is inter-predicted (e.g., predicted with respect to one or two video blocks of reference picture or pictures).

For an intra-predicted video block, referred to as an intra-coded video block, video encoder 20 predicts and encodes the video block with respect to other portions within the picture. Video decoder 30 may decode the intra-coded video block without referencing any other picture of the video data. For an inter-predicted video block, referred to as an inter-coded video block, video encoder 20 predicts and encodes the video block with respect to one or two portions within one or two other pictures. These other pictures are referred to as reference pictures, which may also be pictures that are predicted with reference to yet other reference picture or pictures, or intra-predicted pictures.

Inter-predicted video blocks within a slice may include video blocks that are predicted with respect to one motion vector that points to one reference picture, or two motion vectors that point to two different reference pictures. When a video block is predicted with respect to one motion vector pointing to one reference picture, that video block is considered to be uni-directionally predicted. When a video block is predicted with respect to two motion vectors pointing to two different reference pictures, that video block is considered to be bi-predicted. In some examples, the motion vectors may also include reference picture information (e.g., information that indicates to which reference picture the motion vectors point). However, aspects of this disclosure are not so limited.

For example, a P-slice may include video blocks that are predicted with respect to one reference picture that occurs temporally prior, in display order, to the picture that includes the slice. A B-slice may include video blocks that are predicted with respect to one reference picture that occurs temporally prior, in display order, to the picture that includes the slice, with respect to one reference picture that occurs temporally subsequent, in display order, to the picture that includes the slice, or with respect to one temporally prior reference picture and one temporally subsequent reference picture, each in display order, to the picture that includes the slice.

In some examples, the P- and B-slice classification is expanded to a generalized P/B (GPB) slice. In GPB slices, the video blocks are encoded as a B-slice. For video blocks of GPB slices that are predicted from two reference pictures, in some examples, both of the reference pictures may be temporally prior, in display order, to the picture that includes the slice or temporally subsequent, in display order, to the picture that includes the slice. Similar to B-slices, for a video block of a GPB slice that is predicted from two reference pictures, one reference picture may be temporally subsequent and the other reference picture may be temporally prior, in display order, to the picture that includes the slice.

For instance, a uni-directionally predicted video block is a video block predicted from a one motion vector that points to one reference picture, and may be a uni-directionally predicted video block of a P-slice, a B-slice, or a GPB-slice. A bi-predicted video block is a video block predicted from two motion vectors that each point to two different reference pictures and may be a bi-predicted video block of a B-slice or a GPB-slice. As described in more detail, video encoder 20 and video decoder 30 may utilize a single reference picture list, and in some examples, only the single reference picture list to encode or decode both uni-directionally predicted and bi-predicted video blocks regardless of whether the video blocks are part of a P-slice, B-slice, or GPB-slice.

For example, for inter-predicted video blocks, video encoder 20 may be viewed as constructing a reference picture list that indicates which reference pictures video encoder 20 utilized to predict the current video block. Video decoder 30 may also construct a reference picture list that indicates which reference pictures video encoder 20 utilized to encode a current video block so that video decoder 30 can decode the current video block based on the reference pictures utilized by video encoder 20.

As described in more detail, the example techniques described in this disclosure describe a manner in which video decoder 30 constructs a single reference picture list that indicates which reference pictures video encoder 20 utilized to predict a video block regardless of the manner in which video encoder 20 predicted the video block. Video decoder 30 may decode the inter-predicted video blocks, regardless of the manner in which the video blocks are inter-predicted, utilizing this single reference picture list. In some examples, video encoder 20 may predict the video blocks using its own single reference picture list that indicates which reference pictures video encoder 20 should utilize to predict a video block.

Examples of a video block for any type of a slice include a coding unit (CU), a prediction unit (PU), or a transform unit (TU). To predict a current video block, video encoder 20 identifies blocks of one or two reference pictures that include similar content as the current video block. Video encoder 20 determines a motion vector, for each identified block, that identifies the difference in the location of the block of the current video block to the location of the matching block or blocks in each of the reference pictures.

In some examples, video encoder 20 and video decoder 30 may each construct the single reference picture list that indicates which reference pictures are utilized to predict a video block of a P-slice, a B-slice, or a GPB-slice. Alternatively, only one may construct the single reference picture list, e.g., video decoder 30 but not video encoder 20. The various examples are described with respect to video decoder 30 constructing the single reference picture list, with the realization that video encoder 20 may also construct the single reference picture list in a similar manner. However, at some portions of this disclosure, the construction of the single reference picture list is described from the perspective of video encoder 20 to assist with understanding.

The identifiers for the reference picture or pictures, in the single reference picture list, may be picture order count (POC) values and/or picture number values assigned to the reference pictures. The POC values may indicate the display order of the pictures in a video sequence or group of pictures (GOP). The picture number values may indicate the coding order of the pictures in the video sequence or GOP. As one example, a picture with a smaller POC value compared to another picture is displayed earlier, but is not necessarily coded earlier. A picture with a smaller picture number value compared to another picture is coded earlier, but is not necessarily displayed earlier.

For example, video decoder 30 may construct its single reference picture list that may indicate the reference pictures, e.g., with POC values or picture number values, that will be used to decode video blocks of a slice. In one or more example techniques, video decoder 30 may use this single reference picture list to decode a video block regardless of the manner in which the video block is predicted, e.g., regardless of whether the video block is uni-directionally predicted or bi-predicted.

Moreover, video decoder 30 may decode a video block using the single reference picture list regardless of the number of reference pictures that are used to encode the video block. For instance, assume a video block of a P-slice is predicted with respect to one reference picture, in this example, the single reference picture list includes an identifier for the reference picture used to predict the video block of the P-slice. Assume that a video block of a GPB slice is predicted with respect to two different reference pictures, in this example, the single reference picture list includes the identifier for the reference picture used to predict the video block of the P-slice and includes the identifiers for both of the reference pictures used to predict the video block of the GPB slice.

This single reference picture list may further promote generalization between the different slice types because video decoder 30 utilizes the single reference picture list to decode video blocks of a slice regardless of the manner in which the video blocks of that slice were predicted. For example, conventional techniques required construction of a first reference picture list, referred to as List 0, and construction of a second reference picture list, referred to as List 1. In these conventional techniques, for a video block of a P-slice, video decoder 30 would decode syntax information that would identify the video block as being a video block of a P-slice. Video decoder 30 would then decode syntax information that would indicate where the identifier for reference picture used to predict the video block of the P-slice is located in List 0.

In these conventional techniques, for a video block of a B-slice, video decoder 30 would decode syntax information that would identify the video block as being a video block of a B-slice. Video decoder 30 would then decode syntax information that would indicate whether the video block is predicted from only one reference picture identified in List 0, is predicted from only one reference picture identified in List 1, or is predicted from two reference pictures, where one picture is identified in List 0 and the other picture is identified in List 1. Video decoder 30 would then decode syntax information that would indicate where the identifier for the reference picture or pictures used to predict the video block of the B-slice is located in List 0, List 1, or both List 0 and List 1.

In conventional techniques, for a video block of a GPB slice, video decoder 30 would construct List 1 and List 0. However, in some special situations, video decoder 30 would decode syntax information that indicates that List 1 and List 0 are identical for a particular GPB slice. For these situations, video decoder 30 would construct List 0 and create a duplicate of List 0 to create List 1, or vice versa. Similar to B-slices, even for these situations, in the conventional techniques, video decoder 30 would decode syntax information that would indicate whether the video block of the GPB slice is predicted from only one reference picture identified in List 0, is predicted from only one reference picture identified in List 1, or is predicted from two reference pictures, where one picture is identified in List 0 and the other picture is identified in List 1. Video decoder 30 would then decode syntax information that would indicate where the identifiers for the reference picture or pictures used to predict the video block of the GPB slice is located in List 0, List 1, or both List 0 and List 1.

In the example implementations described in this disclosure, video decoder 30 may not need to rely on a first and second reference picture lists (e.g., List 0 and List 1) to decode video blocks of a P-slice, a B-slice, or a GPB-slice, but may rather utilize the same, single reference picture list to decode video blocks of any slice type. For instance, in the example implementations described in this disclosure, if a video block is encoded with respect to one reference picture, video decoder 30 may decode syntax information that indicates where the identifier for the reference picture is located in the single reference picture list. Also, in the example implementations described in this disclosure, if a video block is encoded with respect to two reference pictures (e.g., a first reference picture and a second reference picture), video decoder 30 may decode syntax information that indicates where the identifier for the first reference picture is located in the single reference picture list, and may decode syntax information that indicates where the identifier for the second reference picture is located in the same, single reference picture list.

In some examples, the first and second reference pictures may be the same reference picture. In these examples, video decoder 30 may still decode syntax information that indicates where the identifier for the first reference picture is located in the single reference picture list, and may decode syntax information that indicates where the identifier for the second reference picture is located in the same, single reference picture list. However, in this example, the decoded syntax information that indicates where the identifiers for the first and second reference pictures are located in the single reference picture list may be the same syntax information.

Also, in one or more examples described in this disclosure, video encoder 20 may not need to signal information (e.g., indicate) regarding whether a video block is for P-slice, a B-slice, or a GPB-slice because video decoder 30 may construct only the single reference picture list to decode video blocks of a P-slice, a B-slice, or a GPB-slice. In other words, in some examples, an indication of a slice type may not be of much relevance because the reference picture list to decode a video block of any slice type is the same, single reference picture list, and in some examples, only the single reference picture list. In this manner, the example implementations described in this disclosure may reduce the amount of syntax elements in the bitstream generated by video encoder 20, and reduce the amount of syntax elements in the bitstream received by video decoder 30.

To further reduce the amount of syntax elements that are coded, e.g., encoded or decoded, in some examples, video decoder 30 may implement a default construction technique to construct the single reference picture list. For instance, the default construction technique to construct the single reference picture list may not require video decoder 30 to receive syntax elements that indicate the manner in which video decoder 30 should construct the single reference picture list. In these examples, video encoder 20 may not encode syntax elements that instruct video decoder 30 in the manner in which video decoder 30 should construct the single reference picture list, thereby further reducing the amount of syntax elements that need to be signaled.

The default construction technique to construct the single reference picture list refers to a set, defined way in which video decoder 30 constructs the single reference picture list. There may be various example implementations of the default construction technique, as described in more detail below. In any event, video encoder 20 may utilize at least one of the example implementations to indicate which reference pictures belong within the single reference picture list. Video decoder 30 may then construct the single reference picture list utilizing the same example implementation that video encoder 20 utilized to indicate which reference pictures belong within the single reference picture list for decoding a video block of any slice type.

The default construction technique to construct the single reference picture list may be based, generally, on temporal distances between the reference pictures that are used to predict the video blocks of the current picture and the current picture. These reference pictures may have been previously decoded. For example, video decoder 30 may decode a video block with previously decoded reference pictures. Video decoder 30 may store the previously decoded reference pictures in an internal buffer or memory.

As one example, the temporal distance between the reference pictures and the current picture (e.g., the picture that includes the predicted video block) may be the difference in presentation time. As described above, each picture may be assigned with a picture order count (POC) value that indicates the order in which the pictures are displayed, i.e., presented. In this example, the temporal distance between two pictures may be the absolute value of the difference in the POC values of the two pictures. For instance, the temporal distance between a reference picture that immediately precedes the current picture in display order and the current picture is one because the absolute value of the difference in the POC values of the reference picture and the current picture will be one. As another example, the temporal distance between a reference picture that immediately follows the immediate next picture from the current picture in display order and the current picture is two because the absolute value of the difference in the POC values of the reference picture and the current picture will be two.

In one example of the default construction technique to construct the single reference picture list, video decoder 30 may include an identifier for each of the reference pictures, in the single reference picture list, in ascending order based on their temporal distances to the current picture. For example, video decoder 30 may place the identifiers for reference pictures that are temporally closer to the current picture (e.g., smaller difference in POC values) at earlier locations in the single reference picture list than identifiers for reference pictures that are temporally further away from the current picture (e.g., larger difference in POC values). In this example, it may be irrelevant whether the reference pictures are temporally prior to or temporally subsequent to the current picture. Also, in this example, the identifiers for the reference pictures may be the picture number values or the POC values for the reference pictures.

In another example of the default construction technique to construct the single reference picture list, video decoder 30 may include an identifier for each of the reference pictures, in the single reference picture list, in descending order based on their temporal distances to the current picture. For example, video decoder 30 may place the identifiers for reference pictures that are temporally further away from the current picture at earlier locations in the single reference picture list than identifiers for reference pictures that are temporally closer to the current picture. Similar to above, in this example, it may be irrelevant whether the reference pictures are temporally prior to or temporally subsequent to the current picture. Also, similar to above, in this option, the identifiers for the reference pictures may be the picture number values or the POC values for the reference pictures.

In some instances, it may be possible that the temporal distances between two reference pictures and the current picture are identical. For example, a first reference picture may be the immediately preceding picture to the current picture, and a second reference picture may be the immediately following picture to the current picture. In this example, the temporal distance between the current picture and the first reference picture is the same as the temporal distance between the current picture and the second reference picture.

In instances where the temporal distances between two reference pictures and the current picture are identical, video decoder 30 may include the identifier for the reference picture with the earlier presentation time, e.g., smaller POC value, at an earlier location in the single reference picture list, and include the identifier for the reference picture with the later presentation time, e.g., larger POC value, at a later location in the single reference picture list. As an alternate example, video decoder 30 may include the identifier for the reference picture with the later presentation time, e.g., larger POC value, in the earlier location in the single reference picture list, and include the identifier for the reference picture with the earlier presentation time, e.g., smaller POC value, at the later location in the single reference picture list.

In either example, the identifier for the reference pictures may be the POC value or the picture number value. For instance, video decoder 30 may utilize the POC values to determine which reference picture is included first in the single reference picture list. However, video decoder 30 may include the POC value or the picture number value as the identifier for the reference pictures in the single reference picture list.

Although the examples above describe temporal distances as being a function of presentation order, aspects of this disclosure are not so limited. In alternate examples, the temporal distances may be a function of coding order. Again, the coding order may be identified by the picture number values. In these alternate examples, video decoder 30 may determine temporal distances based on the absolute value of the difference between the picture number values of the current picture and the reference pictures. Video decoder 30 may list the identifiers for the reference pictures in ascending or descending order, as described above, but based on the difference in picture number values, rather than POC values. In this example, the identifiers for the reference pictures may be picture number values or POC values.

Also, in these alternate examples, in instances where the difference in picture number values between two reference pictures and the current picture is the same, video decoder 30 may place one reference picture earlier than the other in the single reference picture, as described in the example above. In this situation, video decoder 30 may utilize place the reference pictures in the single reference picture list based on the picture number value. For purposes of brevity, the techniques of this disclosure are described in context where the temporal distances are based on the POC values, with the understanding that the techniques of this disclosure are not so limited.

The examples above are described for purposes of illustration only. In general, video decoder 30 may employ any default construction technique to construct a single reference picture list with which video decoder 30 can decode a video block of any slice and regardless of the number of reference pictures that are used to encode the video block. Aspects of this disclosure should not be construed as being limited to the examples described above.

The default construction technique may also include a reordering step, although the reordering step may not be needed in every example of the default construction technique. Prior to reordering, the single reference picture list may be viewed as an initialized picture list. After reordering, the single reference picture list may include the same identifiers for the reference pictures; however, the location of these identifiers of the reference pictures in the single reference picture list may have changed.

For example, the single reference picture list may be viewed as an array with a plurality of locations. Each location within the array may be identified with its index value, and may store an identifier for one of the reference pictures. With reordering, video decoder 30 may modify the location of the identifiers for the reference pictures within the single reference picture list such that at least one index value of the single reference picture list is associated with a different identifier of a reference picture.

In some examples, video encoder 20 may restrict prediction of video blocks of a slice or the entirety of a picture to uni-directional prediction (e.g., prediction with respect to only one reference picture). Such constraints may be referred to as uni-directional predictive coding to indicate that there will only be one motion vector for a video block of any slice type. For example, with such constraints, video blocks of a B-slice and a GPB-slice may not be encoded with more than one reference picture. In general, it may be more complex to encode and decode video blocks of slices that are predicted with respect to two motion vectors that point to one or two reference pictures, as compared to encoding and decoding video blocks of slices that are predicted from only one motion vector pointing to one reference picture. For example, compensation complexity may double for bi-predicted slices, as compared to uni-directionally predicted slices.

Video encoder 20 may encode a syntax element that indicates whether video blocks of a slice are constraint to uni-directional predictive coding. For purposes of illustration, this syntax element is referred to as "uni_pred_only." When the uni_pred_only syntax element is "1" (e.g., true), it indicates that all of the video blocks within a slice are constraint to uni-directional predictive coding. When the uni_pred_only syntax element is "0" (e.g., false) it indicates that it is possible for the video blocks of the slice to be coded with respect to one or two reference pictures. In other words, if uni_pred_only is 0, then one or more video blocks within the slice may possibly be coded with respect to more than one reference picture; however, it may still be possible that none of the video blocks are predicted with respect to more than one reference picture as a consequence of selecting appropriate reference pictures.

In some examples, the uni_pred_only syntax element may be part of the header of the slice. In these examples, video encoder 20 may signal the uni_pred_only syntax element in the header appended to each predicted slice. In alternate examples, the uni_pred_only syntax element may not necessarily be a part of the header of each predicted slice. For instance, it may be possible for an entire picture to be constraint to only uni-directional predictive coding. In these examples, the uni_pred_only syntax element may be part of the header of the entire picture, and not necessarily at the slice-level.

In some alternate examples, video encoder 20 may signal the uni_pred_only syntax element separately from the slice or picture. For instance, if the pictures within a group of pictures (GOP) are all uni-directionally predicted, then video encoder 20 may signal the uni_pred_only syntax element in the picture parameter set (PPS) or the sequence parameter set (SPS). It may also be possible for video encoder 20 to signal the uni_pred_only syntax in the PPS or the SPS, for a certain slice or picture, even in examples where all of the pictures within a GOP are not uni-directionally predicted.

In instances where a picture is not constrained to uni-directionally predicted, video encoder 20 may signal information that indicates how many video blocks within a slice are encoded with respect to two reference pictures. For example, video encoder 20 may signal syntax elements that indicate a percentage of video blocks, e.g., prediction units, within a slice, that are encoded with respect to two reference pictures. In addition to or instead of signaling syntax elements that indicate a percentage of video blocks that are encoded with respect to two reference pictures, video encoder 20 may signal syntax elements that indicate how much of a picture is encompassed by video blocks that are encoded with respect to two multiple pictures. As one example, video encoder 20 may signal syntax elements that indicate that 10% of the video blocks within a picture are encoded with respect to two reference pictures and/or signal syntax elements that indicate that the video blocks that are encoded with respect to two reference pictures encompass 25% of the picture. Video encoder 20 may signal such syntax elements in the slice header or picture header, or separately as part of the PPS or SPS.

The syntax elements described above are provided for illustration purposes and may not be necessary in every example of this disclosure. For example, video encoder 20 may construct a single reference picture list that indicates which reference pictures were used to predict video blocks of any slice type. For the video blocks, video encoder 20 may signal the motion vector or vectors used to predict video blocks, and signal an index value that identifies the location of where the identifiers of the reference picture or pictures are located in the single reference picture list. In addition to the motion vector and index value, video encoder 20 may optionally signal syntax elements such as the uni_pred_only syntax element. Furthermore, video encoder 20 may optionally signal syntax elements that indicate how many video blocks are coded with respect to multiple reference pictures (e.g., as a percentage of video blocks within the picture and/or as a percentage of area encompassed by the video blocks in the picture).

In some examples, instead of signaling motion vectors for a video block, video encoder 20 may signal one or more motion predictors. A motion vector may be predicted from the one or more motion predictors. For example, the average of the motion predictors may result in the motion vector. For instance, if N motion predictors are used for a motion vector, then the average of the N motion predictors may result in the motion vector.

Video decoder 30 may receive all this information directly from source device 12 via communication channel 16, or from storage medium 17 or file server 19. Video decoder 30 may then construct its own single reference picture list. As one example, video decoder 30 may construct its own single reference picture list by implementing the default construction techniques (e.g., without receiving information for how to construct the single reference picture list). Then, if video encoder 20 signaled information instructing video decoder 30 to reorder the single reference picture list, video decoder 30 may reorder the single reference picture list.

To decode a video block of any slice type, video decoder 30 may decode the motion vector or vectors information and the index value or values. With the index value or values, video decoder 30 may identify the reference pictures or pictures from the single reference picture list regardless of whether the video block is uni-directionally predicted or bi-predicted, and regardless of whether the video block is of a P-slice, B-slice, or GPB-slice. Video decoder 30 may retrieve the identified reference picture or pictures from its memory, and decode the video blocks with the retrieved reference picture or pictures and the decoded motion vector or vectors information. Again, reference picture or pictures used to decode a video block are reference picture or pictures that have been previously decoded and stored.

In examples where video encoder 20 signals syntax elements such as the uni_pred_only syntax elements, and/or the additional syntax elements such as percentage of video blocks that are encoded with respect to multiple reference pictures, video decoder 30 may utilize these syntax elements for decoding. For example, if video encoder 20 indicated that uni_pred_only is 1 (e.g., true), video decoder 30 may bypass any initialization steps that may be needed to decode video blocks that are encoded with respect to more than one reference picture. For example, video decoder 30 may recognize that it should not wait for two index values within the single reference picture list to decode a video block when the uni_pred_only_flag is true for the slice that includes the video block. In this way, the uni_pred_only syntax element may increase the computational efficiency of video decoder 30.

The syntax elements that indicate the how many video blocks, e.g., prediction units, are coded with respect to multiple reference pictures may similarly promote efficient video decoder 30 processing. For example, with such syntax elements, video decoder 30 may be knowledge regarding how many video blocks need two or more index values within the single reference picture list (e.g., the percentage of video blocks are encoded with respect to two reference pictures). This may increase the computational efficiency of the video decoder 30. For example, in some instances, as described above, bi-prediction may be more computationally complex than uni-directional prediction. With an indication of how many video block need two more index values within the single reference picture list, video decoder 30 may be knowledgeable as to how complex the prediction will be, and may be able to allocate appropriate resources for decode bi-predicted and uni-directionally predicted slices.

As described above, the JCT-VC is working on development of the HEVC standard, sometimes referred to as the future H.265 standard. The following is a more detailed description of the HEVC standard to assist with understanding. However, as indicated above, the techniques of this disclosure are not limited to the HEVC standard, and may be applicable to video coding in general.

The HEVC standardization efforts are based on a model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM provides as many as thirty-three intra-prediction encoding modes.

The HM refers to a block of video data as a coding unit (CU). Syntax data within a bitstream may define a largest coding unit (LCU), which is a largest coding unit in terms of the number of pixels. In general, a CU has a similar purpose to a macroblock of the H.264 standard, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be further split into sub-CUs. Syntax data for a bitstream may define a maximum number of times an LCU may be split, referred to as CU depth. Accordingly, a bitstream may also define a smallest coding unit (SCU).

A CU that is not further split may include one or more prediction units (PUs). In general, a PU represents all or a portion of the corresponding CU, and includes data for retrieving a reference sample for the PU. For example, when the PU is intra-mode encoded, i.e., intra-predicted, the PU may include data describing an intra-prediction mode for the PU. As another example, when the PU is inter-mode encoded, i.e., inter-predicted, the PU may include data defining a motion vector for the PU.

The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list for the motion vector. Data for the CU defining the PU(s) may also describe, for example, partitioning of the CU into one or more PUs. Partitioning modes may differ between whether the CU is skip or direct mode encoded, intra-prediction mode encoded, or inter-prediction mode encoded.

A CU having one or more PUs may also include one or more transform units (TUs). Following prediction using a PU, video encoder 20 may calculate residual values for the portion of the CU corresponding to the PU. The residual values correspond to pixel difference values that may be transformed into transform coefficients quantized, and scanned to produce serialized transform coefficients for entropy coding. A TU is not necessarily limited to the size of a PU. Thus, TUs may be larger or smaller than corresponding PUs for the same CU. In some examples, the maximum size of a TU may be the size of the corresponding CU. This disclosure uses the term "video block" to refer to any of a CU, PU, or TU.

A video sequence typically includes a series of video pictures. A group of pictures (GOP) generally comprises a series of one or more video pictures. A GOP may include syntax data in a header of the GOP, a header of one or more pictures of the GOP, or elsewhere, that describes a number of pictures included in the GOP. Each picture may include picture syntax data that describes an encoding mode for the respective picture. Video encoder 20 typically operates on video blocks within individual video pictures in order to encode the video data. A video block may correspond to a coding unit (CU) or a partition unit (PU) of the CU. The video blocks may have fixed or varying sizes, and may differ in size according to a specified coding standard. Each video picture may include a plurality of slices. Each slice may include a plurality of CUs, which may include one or more PUs.

As an example, the HEVC Test Model (HM) supports prediction in various CU sizes. The size of an LCU may be defined by syntax information. Assuming that the size of a particular CU is 2N×2N, the HM supports intra-prediction in sizes of 2N×2N or N×N, and inter-prediction in symmetric sizes of 2N×2N, 2N×N, N×2N, or N×N. The HM also supports asymmetric splitting for inter-prediction of 2N×nU, 2N×nD, nL×2N, and nR×2N. In asymmetric splitting, one direction of a CU is not split, while the other direction is split into 25% and 75%. The portion of the CU corresponding to the 25% split is indicated by an "n" followed by an indication of "Up", "Down," "Left," or "Right." Thus, for example, "2N×nU" refers to a 2N×2N CU that is split horizontally with a 2N×0.5N PU on top and a 2N×1.5N PU on bottom.

In this disclosure, "N×N" and "N by N" may be used interchangeably to refer to the pixel dimensions of a video block (e.g., CU, PU, or TU) in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding to produce a PU for a CU, video encoder 20 may calculate residual data to produce one or more transform units (TUs) for the CU. PUs of a CU may comprise pixel data in the spatial domain (also referred to as the pixel domain), while TUs of the CU may comprise coefficients in the transform domain, e.g., following application of a transform such as a discrete cosine transform (DCT), an integer transform, a wavelet transform, or a conceptually similar transform to residual video data. The residual data may correspond to pixel differences between pixels of the unencoded picture and prediction values of a PU of a CU. Video encoder 20 may form one or more TUs including the residual data for the CU. Video encoder 20 may then transform the TUs to produce transform coefficients.

Following any transforms to produce transform coefficients, quantization of transform coefficients may be performed. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), or another entropy encoding methodology.

To perform CABAC, video encoder 20 may select a context model to apply to a certain context to encode symbols to be transmitted. The context may relate to, for example, whether neighboring values are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on the context assigned to the symbols.

Video decoder 30 may operate in a manner essentially symmetrical to that of video encoder 20. For example, video decoder 30 may receive entropy encoded data representative of encoded CUs of a video picture. Video decoder 30 may construct a single reference picture list utilizing the default construction techniques to identify which reference pictures are needed to decode inter-predicted CUs.

Figure 2:
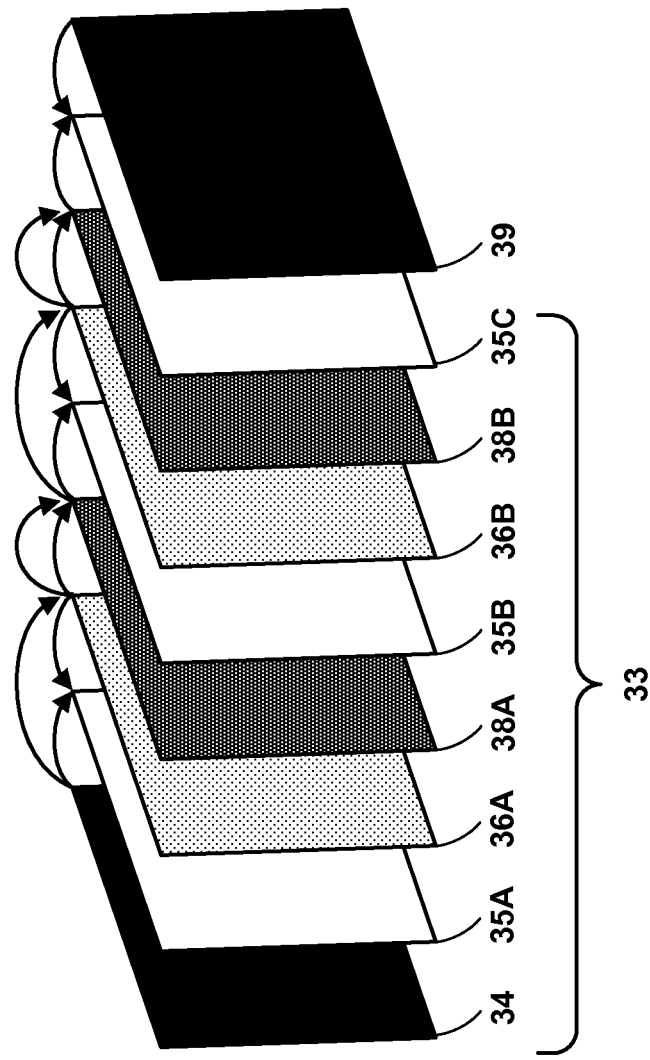
FIG. 2 is a conceptual diagram illustrating an example video sequence that includes video pictures in display order.

FIG. 2 is a conceptual diagram illustrating an example video sequence 33 that includes pictures 34, 35A, 36A, 38A, 35B, 36B, 38B, and 35C, in display order. One or more of these pictures may include P-slices, B-slices, or GPB-slices. In some cases, video sequence 33 may be referred to as a group of pictures (GOP). Picture 39 is a first picture in display order for a sequence occurring after sequence 33. FIG. 2 generally represents an exemplary prediction structure for a video sequence and is intended only to illustrate the picture references used for encoding different inter-predicted slice types. An actual video sequence may contain more or fewer video pictures that include different slice types and in a different display order.

For block-based video coding, each of the video pictures included in sequence 33 may be partitioned into video blocks or coding units (CUs). Each CU of a video picture may include one or more prediction units (PUs). Video blocks or PUs in an intra-predicted picture are encoded using spatial prediction with respect to neighboring blocks in the same picture. Video blocks or PUs in an inter-predicted picture may use spatial prediction with respect to neighboring blocks in the same picture or temporal prediction with respect to other reference pictures.

Video blocks in a B-slice or a GPB-slice may be encoded using bi-predictive coding to calculate two motion vectors from two reference pictures identified in a single reference picture list. Video blocks of a P-slice, and in some cases, video blocks of a B-slice or a GPB-slice may be encoded using uni-directional predictive coding from one reference picture identified in the single reference picture list. In accordance with one or more examples described in this disclosure, the inter-predicted video blocks of one or more pictures illustrated in FIG. 2 may be inter-predicted with respect to reference pictures indicated in the single reference picture list regardless of the manner in which the video blocks are inter-predicted (e.g., regardless of whether the video block is part of a P-slice, B-slice, or GPB-slice), and regardless of the number of reference pictures used to encode the video blocks (e.g., regardless of whether the video block is uni-directional predicted to bi-predicted).

In the example of FIG. 2, first picture 34 is designated for intra-mode coding as an I picture. In other examples, first picture 34 may be coded with inter-mode coding, e.g., as a P-picture, B-picture, or GPB-picture, with reference to a first picture of a preceding sequence. Video pictures 35A-35C (collectively "video pictures 35") are designated for coding as B-pictures or GPB-pictures using bi-prediction with reference to a past picture and a future picture. In the illustrated example, picture 35A is encoded as a B-picture or a GPB-picture with reference to first picture 34 and picture 36A, as indicated by the arrows from picture 34 and picture 36A to video picture 35A. Pictures 35B and 35C are similarly encoded.

Video pictures 36A-36B (collectively "video pictures 36") may be designated for coding as P-pictures, B-pictures, or GPB-pictures using uni-direction prediction with reference to a past picture. In the illustrated example, picture 36A is encoded as a P-picture, B-picture, or GPB-picture with reference to first picture 34, as indicated by the arrow from picture 34 to video picture 36A. Picture 36B is similarly encoded as a P-picture, B-picture, or GPB-picture with reference to picture 38A, as indicated by the arrow from picture 38A to video picture 36B.

Video pictures 38A-38B (collectively "video pictures 38") may be designated for coding as P-pictures, B-pictures, or GPB-pictures using uni-directional prediction with reference to the same past picture. In the illustrated example, picture 38A is encoded with two references to picture 36A, as indicated by the two arrows from picture 36A to video picture 38A. Picture 38B is similarly encoded.

Figure 3:
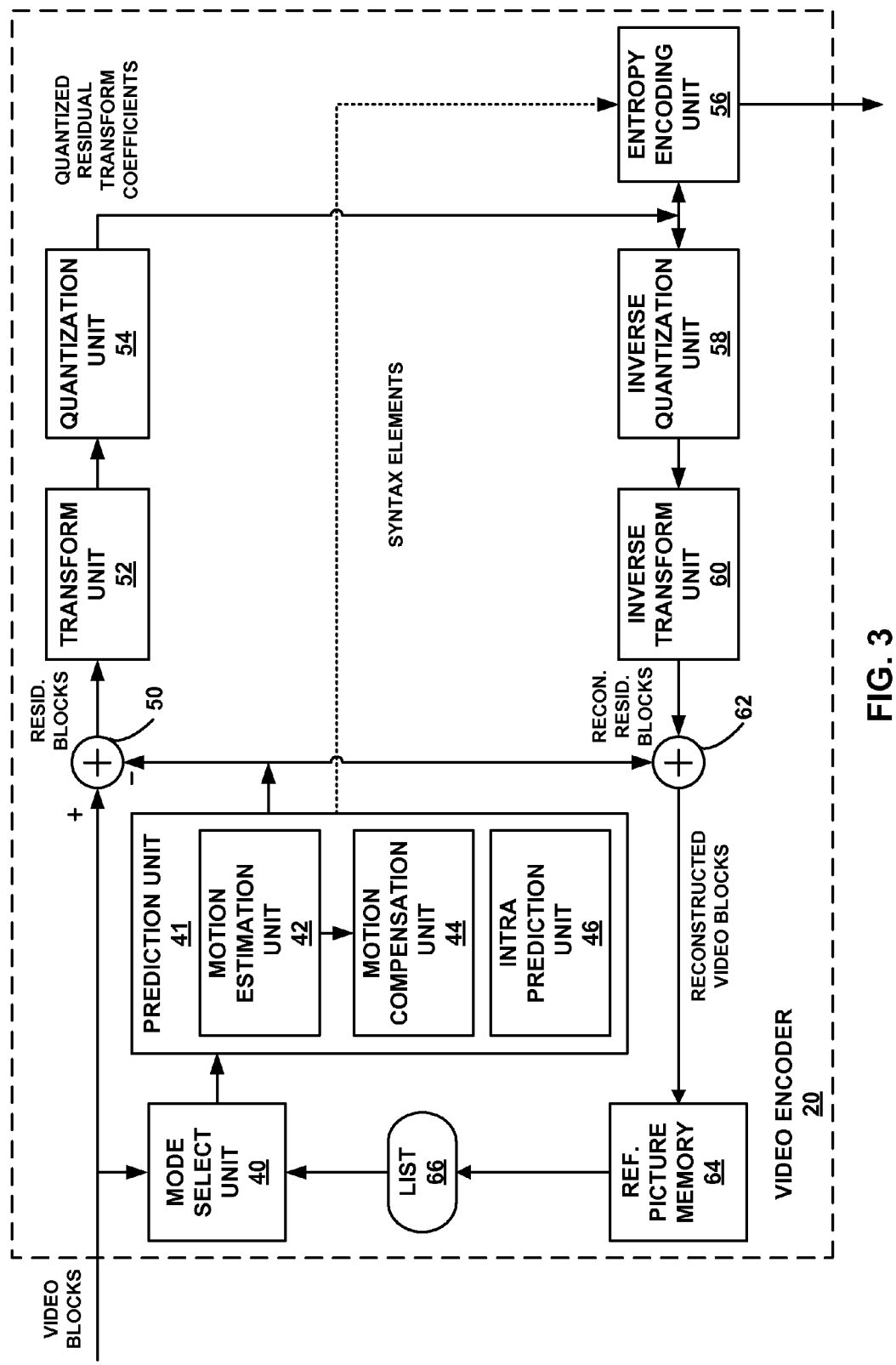
FIG. 3 is a block diagram illustrating an example video encoder that may implement techniques in accordance with one or more aspects of this disclosure.

FIG. 3 is a block diagram illustrating an example of video encoder 20 that may implement techniques in accordance with one or more aspects of this disclosure. Video encoder 20 may also optionally implement techniques for signaling syntax elements that indicate whether video blocks of slices or pictures are constraint to uni-directional prediction, that indicate how many video blocks are encoded with multiple reference pictures, and/or that indicate how much of a picture is encoded with multiple reference pictures. Video encoder 20 may perform intra- and inter-coding of video blocks within video pictures. Intra-coding relies on spatial prediction to reduce or remove spatial redundancy in video within a given video picture. Inter-coding relies on temporal prediction to reduce or remove temporal redundancy in video within adjacent pictures of a video sequence. Intra-mode (I mode) may refer to any of several spatial based compression modes. Inter-modes such as unidirectional prediction (P mode), bi-prediction (B mode), or generalized P and B prediction may refer to any of several temporal-based compression modes.

In the example of FIG. 3, video encoder 20 includes mode select unit 40, prediction unit 41, reference picture memory 64, summer 50, transform unit 52, quantization unit 54, and entropy encoding unit 56. Prediction unit 41 includes motion estimation unit 42, motion compensation unit 44, and intra prediction unit 46. For video block reconstruction, video encoder 20 also includes inverse quantization unit 58, inverse transform unit 60, and summer 62. A deblocking filter (not shown in FIG. 3) may also be included to filter block boundaries to remove blockiness artifacts from reconstructed video. If desired, the deblocking filter would typically filter the output of summer 62.

As shown in FIG. 3, video encoder 20 receives a current video block within a video picture or slice to be encoded. The picture or slice may be divided into multiple video blocks or CUs, as one example, but include PUs and TUs as well. Mode select unit 40 may select one of the coding modes, intra or inter, for the current video block based on error results, and prediction unit 41 may provide the resulting intra- or inter-coded block to summer 50 to generate residual block data and to summer 62 to reconstruct the encoded block for use as a reference picture.

Intra prediction unit 46 within prediction unit 41 may perform intra-predictive coding of the current video block relative to one or more neighboring blocks in the same picture or slice as the current block to be coded to provide spatial compression. Motion estimation unit 42 and motion compensation unit 44 within prediction unit 41 perform inter-predictive coding of the current video block relative to one or more predictive blocks in one or more reference pictures to provide temporal compression. The one or more reference pictures may be selected from a single reference picture list 66. Video encoder 20 may be construct single reference picture list 66 based on decoded reference pictures stored in reference picture memory 64.

Motion estimation unit 42 may be configured to determine the inter-prediction mode for a video picture according to a predetermined pattern for a video sequence. The predetermined pattern may designate video pictures or slices in the sequence as P-picture or P-slice, B-picture or B-slice, and GPB-picture or GPB-slice. Motion estimation unit 42 may determine whether to encode video blocks of a video slice as a P-slice, B-slice, or GPB-slice.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a video block within a current video picture relative to a predictive block within a reference picture. A predictive block is a block that is found to closely match the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may calculate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a video block of an inter-coded video block by comparing the position of the video block to the position of a predictive block of a reference picture in single reference picture list 66. For example, when a video block is uni-directionally predicted, motion estimation unit 42 may use uni-predictive coding for the video block and calculate a single motion vector from one reference picture indicated in single reference picture list 66 that includes identifiers for the reference pictures (e.g., POC values or picture number values for the reference pictures). In this example, the video block may be a video block of a P-slice, a B-slice, or a GPB-slice. In another example, when the video slice is bi-predicted, motion estimation unit 42 may use bi-predictive coding for the video block and calculate two motion vectors from two different reference pictures indicated in single reference picture list 66 that includes identifiers for two reference pictures. In this example, the video block may be a video block of a B-slice or a GPB-slice.

In other words, single reference picture list 66 may include identifiers that identify both of the reference pictures used to predict a bi-predicted video block, and single reference picture list 66 may include identifiers that identify the reference picture used to predict a uni-directionally predicted video block. In this way, single reference picture list 66 may include identifiers for only temporally prior reference pictures (e.g., where the video block is uni-directionally predicted and of a P-slice, a B-slice, or a GPB-slice), only temporally subsequent reference pictures (e.g., where the video block is uni-directionally predicted and of a B-slice or GPB-slice), or both temporally subsequent and temporally prior reference pictures (e.g., where the video block is bi-predicted and of a B-slice or GPB-slice). In this example, temporally subsequent reference pictures refer to reference pictures that are displayed after the picture that includes the predicted video block. Also, in this example, temporally prior reference pictures refer to reference pictures that are displayed prior to the picture that includes the predicted video block.

Motion estimation unit 42 sends the calculated motion vector to entropy encoding unit 56 and motion compensation unit 44. Motion compensation, performed by motion compensation unit 44, may involve fetching or generating the predictive block based on the motion vector determined by motion estimation. More specifically, in the case of an inter-predicted block, motion compensation unit 44 may construct single reference picture list 66 from decoded reference pictures stored in reference picture memory 64. Upon receiving the motion vector for the current video block, motion compensation unit 44 may locate the predictive block to which the motion vector points in single reference picture list 66. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation.

In some examples, where a video block is predicted from two reference pictures (e.g., bi-predicted), motion compensation unit 44 may encode the two motion vectors that each point to their respective reference pictures jointly using motion predictors. The use of motion predictors in not necessary for every example, and is described for illustration purposes only. For ease of description, the two motion vectors that point to their respective reference pictures are referred to as a first and second motion vectors.

Motion compensation unit 44 may reduce bits used to signal the motion vectors by reducing or eliminating the syntax elements conventionally used to represent the second motion vector. Video encoder 20 then jointly encodes the first and second motion vectors. For example, video encoder 20 may conventionally encode the first motion vector relative to a motion predictor, and then encode the second motion vector relative to the first motion vector. Video encoder 20 signals the jointly encoded motion vectors along with other prediction syntax for each bi-predicted video block to video decoder 30 at the video block level, as one example.

Motion compensation unit 44 receives the first and second motion vectors for a current video block from motion estimation unit 42. Motion compensation unit 44 then generates a first motion predictor for the first motion vector from a motion vector of a neighboring video block. For example, the first motion vector for the current video block may point to a predictive block in single reference picture from list 66. The first motion predictor may, therefore, be generated from a motion vector of a neighboring video block that neighbors the current video block to be encoded that points to another block in the same single reference picture from list 66.

Motion compensation unit 44 generates the syntax elements to represent the first motion vector relative to the first motion predictor. For example, motion compensation unit 44 generates the first syntax element, i.e., mvd, defined to indicate a difference between the first motion vector and the first motion predictor, and the second syntax element, i.e., ref_idx, defined to indicate an index in single reference picture list 66 of the reference picture from which the first motion predictor is generated. In this way, video encoder 20 may conventionally encode the first motion vector relative to the first motion predictor with the syntax elements generated by motion compensation unit 44.

Motion compensation unit 44 may not generate a second motion predictor for the second motion vector from a neighboring video block, but instead uses the first motion vector as the second motion predictor. Video encoder 20 then encodes the second motion vector for the video block relative to the first motion vector. In this way, the second motion vector may be encoded as the difference between the first motion vector and the second motion vector. In some examples, motion compensation unit 44 may not generate any syntax elements for the second motion vector. In other examples, motion compensation unit 44 may generate only the first syntax element defined to indicate a difference between the second motion vector and the first motion vector.

In some cases, video encoder 20 may only jointly encode the first and second motion vectors when the motion vectors point to the same reference picture or substantially similar reference pictures. When the first and second motion vectors do not point to the same reference picture, the first motion vector may be scaled according to a temporal distance between the first motion vector and the second motion vector before using the first motion vector as the second motion predictor.

In some examples, motion predictors for motion vectors of a current block may be generated from multiple motion vectors of neighboring blocks. In this case, motion compensation unit 44 may generate the first motion predictor for the first motion vector of the current video block from a plurality of candidate motion vectors of neighboring video blocks. Motion compensation unit 44 may also generate a second motion predictor for the second motion vector of the current video block from a plurality of candidate motion vectors that includes the first motion vector or the first motion predictor. In this case, the second motion vector may still be encoded relative to the first motion vector, but not exclusively based on the first motion vector (e.g., may also be based on the first motion predictor). In examples where motion compensation unit 44 generates a motion predictor from a plurality of candidate motion vectors, these plurality of candidate motion vectors may be processed (such as average, median-filter, majority rule, or other techniques) to generate the motion predictor. For example, motion compensation unit 44 may utilize four candidate motion vectors that are averaged to generate the motion predictor.

Motion compensation unit 44 may also generate syntax elements defined to represent prediction information at one or more of a video sequence level, a video picture level, a video slice level, a video coding unit level, or a video prediction unit level. For example, motion compensation unit 44 may generate syntax elements that indicate whether prediction is constraint to uni-directional predictive coding. For instance, motion compensation unit 44 may constrain video blocks for a P-slice, B-slice, or GPB-slice to be predicted from only one reference picture (e.g., uni-directional prediction). For these situations, motion compensation unit 44 may generate a syntax element, referred to as uni_pred_only, which indicates whether motion compensation unit 44 constrained the prediction to only uni-directional prediction. Uni_pred_only syntax element may be viewed as a flag with two states: true and false, represented by one bit (e.g., "1" for true, and "0" for false).

When true, uni_pred_only indicates that prediction is limited to uni-directional prediction (e.g., only one reference picture is used for encoding or decoding a particular video block). In this case, the video blocks of a slice are predicted from one reference picture. However, this does not mean that all of the video blocks are predicted from the same reference picture, although this may be possible. Rather, one video block of slice may be predicted from one reference picture, and another video block of the slice may be predicted from another reference picture, but both of these video blocks are predicted from only one reference picture. When false, uni_pred_only indicates that prediction is not limited to uni-directional prediction. In this case, it may be possible that some or all blocks of a slice may still be predicted with respect to one reference picture.

Motion compensation unit 44 may optionally also include additional syntax elements that indicate the manner in which the video blocks of a slice were predicted. For example, motion compensation unit 44 may indicate how many of the video blocks of a slice (e.g., a B-slice or a GPB-slice) are predicted with respect to more than one reference picture when uni_pred_only is false. Such indication may be signaled as a percentage. As another example, motion compensation unit 44 may indicate how much of a picture is predicted with respect to more than one reference picture when unit_pred_only is false. Such indication may also be signaled as a percentage.

Motion compensation unit 44 may include these syntax elements in the header of a slice or a picture, or separately from the slice and picture. For example, if the all of the video blocks of the pictures in a sequence parameter set (SPS) or picture parameter set (PPS) are uni-directionally predicted, motion compensation unit 44 may include the uni_pred_only syntax element as part of the SPS or PPS. Motion compensation unit 44 may similarly include syntax elements that indicate how many slices are inter-predicted with respect to two reference pictures, and how much of a picture is inter-predicted with respect to two reference pictures. In some examples, motion compensation unit 44 may also include one or more syntax elements that indicate whether a video block is coded, e.g., predicted, using bi-prediction or uni-direction prediction.

The following tables 1-3 provide pseudo-code that illustrates the manner in which motion compensation unit 44 includes the uni_pred_only syntax element as a part of the SPS, PPS, and slice header respectively.

TABLE 1

SEQUENCE PARAMETER SET SYNTAX

| seq_parameter_set_rbsp( ) { | C | Descriptor |
|---|---|---|
| . . . | | |
| num_ref_frames | 0 | ue(v) |
| . . . | | |
| uni_pred_only_flag | 0 | u(1) |
| . . . | | |
| rbsp_trailing_bits( ) | 0 | |
| } | | |

TABLE 2

PICTURE PARAMETER SET SYNTAX

| pic_parameter_set_rbsp( ) { | C | Descriptor |
|---|---|---|
| pic_parameter_set_id | 1 | ue(v) |
| seq_parameter_set_id | 1 | ue(v) |
| entropy_coding_mode_flag | 1 | u(1) |
| num_ref_idx_default_active_minus1 | 1 | ue(v) |
| uni_pred_only_flag | | |
| pic_init_qp_minus26 /* relative to 26 */ | 1 | se(v) |
| constrained_intra_pred_flag | 1 | u(1) |
| for(i=0;i<15; i++){ | | |
| numAllowedFilters[i] | 1 | ue(v) |
| for(j=0;j<numAllowedFilters;j++){ | | |
| filtIdx[i][j] | 1 | ue(v) |
| } | | |
| } | | |
| rbsp_trailing_bits( ) | 1 | |
| } | | |

TABLE 3

SLICE HEADER SYNTAX

| slice_header( ) { | C | Descriptor |
|---|---|---|
| first_lctb_in_slice | 2 | ue(v) |
| slice_type | 2 | ue(v) |
| pic_parameter_set_id | 2 | ue(v) |
| frame_num | 2 | u(v) |
| if( IdrPicFlag ) | | |

TABLE 3-continued

SLICE HEADER SYNTAX

| slice_header( ) { | C | Descriptor |
|---|---|---|
|     idr_pic_id | 2 | ue(v) |
|     pic_order_cnt_lsb | 2 | u(v) |
|     if( slice_type != I ) | | |
|         num_ref_idx_active_override_flag | 2 | u(1) |
|         if( num_ref_idx_active_override_flag ) { | | |
|             num_ref_idx_ active_minus1 | 2 | ue(v) |
|     ref_pic_list_modification( ) | | |
|     non_uni_predict_flag | 2 | u(1) |
|     if( nal_ref_idc != 0 ) | | |
|         dec_ref_pic_marking( ) | 2 | |
|     if( entropy_coding_mode_flag ) { | | |
|         pipe_multi_codeword_flag | 2 | u(1) |
|         if( !pipe_multi_codeword_flag ) | | |
|             Pipe_max_delay_shift_6 | 2 | ue(v) |
|     else | | |
|       Balanced_cpus | 2 | u(8) |
|       if( slice_type != I ) | | |
|         cabac_init_idc | 2 | ue(v) |
|     } | | |
|     slice_qp_delta | 2 | se(v) |
|     alf_param( ) | | |
|     if( slice_type != I ) { | | |
|         mc_interpolation_idc | 2 | ue(v) |
|         mv_competition_flag | 2 | u(1) |
|         if ( mv_competition_flag ) { | | |
|             mv_competition_temporal_flag | 2 | u(1) |
|         } | | |
|     } | | |
|     if (!non_uni_predict_flag | | |
|     && mv_competition_flag) | | |
|       Collocated_from_l0_flag | 2 | u(1) |
|     sifo_param( ) | | |
|     edge_based_prediction_flag | 2 | u(1) |
|     if( edge_prediction_ipd_flag == 1 ) | | |
|       threshold edge | 2 | u(8) |
| } | | |

In the example pseudo code of tables 1-3, when the uni_pred_only_flag (e.g., in tables 1 and 2) is equal to 1, or when the non_uni_predict_flag (e.g., in table 3) is equal to 0, the inter-predicted video blocks are predicted with only one reference picture. For example, uni_pred_only_flag may be binary value of either "1" for true, or "0" for false, and non_uni_predict_flag may be the Boolean opposite of uni_pred_only_flag. In the example of table 3, num_ref_idx_active_minus1 specifies the maximum reference index for single reference picture list 66 that video decoder 30 can utilize to decode a slice. In some examples, motion compensation unit 44 may further include a num_predictors_pu syntax element that indicates the number of reference pictures that are used to encode a slice.

Motion compensation unit 44 may also include additional syntax elements which may indicate the manner in which motion compensation unit 44 inter-predicted a video block. For example, motion compensation unit 44 may include syntax elements that indicate how many slices of a picture are predicted with respect to multiple reference pictures (e.g., bi-predicted). As another example, motion compensation unit 44 may include syntax elements that indicate how much area of a picture is predicted with respect to multiple reference pictures. The uni_pred_only syntax element and these additional syntax elements may reduce the complexity of encoding and/or decoding a slice or a picture, as discussed above.

In general, motion compensation unit 44 signals motion vector information or motion predictor information for each reference picture from which a current video block is predicted. For purposes of illustration and brevity only, assume that motion compensation unit 44 signals motion vector information. Motion compensation unit 44 also signals information for the index value or values, of the single reference picture list constructed by video decoder 30, that indicates where in the single reference picture list an identifier or identifiers for the reference pictures is located.

In examples where a video block is predicted with respect to single reference picture, motion compensation unit 44 signals the residual between the video block and the matching block of the reference picture. In examples where a video block is predicted with respect to two reference pictures, motion compensation unit 44 may signal the residual between the video block and the matching blocks of the each of the reference pictures. Motion compensation unit 44 may signal this residual or residuals from which video decoder 30 decodes the video block.

Motion compensation unit 44 may construct single reference picture list 66 for the video blocks of any slice type. In alternate examples, a unit of video encoder 20, other than motion compensation unit 44, may construct single reference picture list 66. However, for purposes of illustration, the examples are described with respect to motion compensation unit 44 constructing single reference picture list 66.

Single reference picture list 66 may include the identifiers for the one or more reference pictures that motion compensation unit 44 utilized to encode video blocks of any slice type. In other words, the identifiers for the reference pictures stored in single reference picture list 66 may be identifiers for the reference pictures regardless of whether video blocks are portions of a P-slice, B-slice, or GPB-slice. Also, when a video block of a B-slice or GPB-slice is encoded with respect to two reference pictures, single reference picture list 66 includes identifiers for each of the reference pictures. In this manner, only a single reference picture list 66 may be required to identify which reference pictures were utilized to encode a video block of any slice type including when the video block is encoded with respect to more than one reference picture.

In some examples, motion compensation unit 44 may utilize default construction techniques to construct single reference picture list 66. For example, for a video block of a current picture, motion compensation unit 44 may determine the temporal differences between the current picture and the one or more reference pictures used to encode the video block. In one example, motion compensation unit 44 may include identifiers for the one or more reference pictures that are temporally closer to the current picture earlier in locations in single reference picture list 66 than identifiers for the one or more reference pictures that are temporally further away from the current picture. As an alternate example, motion compensation unit 44 may include identifiers for the one or more reference pictures that are temporally further away from the current picture earlier in locations in single reference picture list 66 then identifiers for the one or more reference pictures that are temporally closer to the current picture.

The temporal distances between the current picture and the one or more reference pictures may be based on their respective POC values or picture number values. For purposes of illustration and brevity, the techniques are described with respect to POC values, but the techniques may similarly use picture number values instead.

As one example, if the absolute value of the difference in the POC values between a current picture and a first reference picture is less than the absolute value of the difference in the POC values between a current picture and a second reference picture, then the first reference picture is considered to be temporally closer than the second reference picture. Also, in this example, it may not be relevant whether the first and second reference pictures are both temporally prior reference pictures or temporally subsequent reference pictures, or whether one is a temporally prior reference picture and the other is a temporally subsequent reference picture. The identifiers that motion compensation unit 44 includes in single reference picture list 66 may be the POC values or the picture number values for the one or more reference pictures.

In examples where the temporal distance between two reference pictures is identical, motion compensation unit 44 may include the identifier for the reference picture with the lower POC value first in the single reference picture list 66 and insert the reference picture with the higher POC value second. As an alternate example, motion compensation unit 44 may include the identifier for the reference picture with the higher POC value first in the single reference picture list 66 and insert the reference picture with the lower POC value second.

For each video block, motion compensation unit 44 may signal information that indicates the motion vector or vectors associated with each reference picture or pictures, and an index value that indicates to video decoder 30 where the reference picture or pictures, associated with each motion vector, is located in the single reference picture that video decoder 30 constructs. For example, when a video block is coded with respect to two reference pictures, motion compensation unit 44 may signal information that indicates where the identifiers for each of the two reference pictures is located within only the single reference picture list that video decoder 30 constructs. Motion compensation unit 44 may not signal index values for any other reference picture list because no such other reference picture list may be needed for decoding the video block. The index value information may be encoded by entropy encoding unit 56 as described in more detail below.

In some examples, motion compensation unit 44 may not need to include syntax elements that indicate the manner in which video decoder 30 should construct its single reference picture list. The single reference picture, constructed on the video decoder 30 side, may include identifiers for reference pictures that are identical to the reference pictures in single reference picture list 66 for a given video block. By not signaling syntax elements that indicate the manner in which video decoder 30 should construct its single reference picture list, motion compensation unit 44 may reduce the amount of information that needs to be signaled.

In some examples, the syntax elements signaled by motion compensation unit 44 may also include syntax elements defined to represent prediction weights and offsets applied to reference pictures in single reference picture list 66. The syntax elements representing prediction weights and offsets may comprise a table that instructs decoder 30 to apply certain weight and offset values to each reference picture of the associated reference picture list. In some cases, the prediction weight and offset table may provide different weights and offset for luma and chroma portions of the reference pictures. Table 4 includes example pseudo-code for the prediction weight table syntax.

TABLE 4

PREDICTION WEIGTH TABLE SYNTAX

| pred_weight_table( ) { | C | Descriptor |
|---|---|---|
|    luma_log2_weight_denom | 2 | ue(v) |
|    chroma_log2_weight_denom | 2 | ue(v) |
|    for( i = 0; i <= num_ref_idx_active_minus1; i++ ) { | | |
|       luma_weight_l0_flag | 2 | u(1) |
|       If( luma_weight_l0_flag ) { | | |
|          luma_weight_l0[ i ] | 2 | se(v) |
|          luma_offset_l0[ i ] | 2 | se(v) |
|       } | | |
|       chroma_weight_l0_flag | 2 | u(1) |
|       If( chroma_weight_l0_flag ) | | |
|          for( j =0; j < 2; j++ ){ | | |
|             chroma_weight_l0[ i ][ j ] | 2 | se(v) |
|             chroma_offset_l0[ i ][ j ] | 2 | se(v) |
|          } | | |
|    } | | |
| } | | |

In some examples, motion compensation unit 44 may include syntax elements that cause video decoder 30 to reorder its locally constructed single reference picture list. In these examples, motion compensation unit 44 may provide the index values for where the reference pictures used to decode a video block are located in the reordered single reference picture list. Reordering of the single reference picture of video decoder 30 may not be necessary in every example. Table 5 illustrates example pseudo-code that motion compensation unit 44 may signal to instruct video decoder 30 to reorder its single reference picture list.

TABLE 5

REFERENCE PICTURE LIST REORDERING SYNTAX

| ref_pic_list_reordering( ) { | C | Descriptor |
|---|---|---|
|    if( slice_type != I && slice_type != SI ) { | | |
|       ref_pic_list_reordering_flag | 2 | u(1) |
|       if( ref_pic_list_reordering_flag) | | |
|          do { | | |
|             reordering_of_pic_nums_idc | 2 | ue(v) |
|             if( reordering_of_pic_nums_idc = = 0 \|\| | | |
|                reordering_of_pic_nums_idc = = 1 ) | | |
|                abs_diff_pic_num_minus1 | 2 | ue(v) |
|             else if( reordering_of_pic_nums_idc = = 2 ) | | |
|                long_term_pic_num | 2 | ue(v) |
|         } while( reordering_of_pic_nums_idc != 3 ) | | |
|    } | | |
| } | | |

In the pseudo-code of table 5, the ref_pic_list_reodering_flag indicates whether video decoder 30 should reorder its constructed single reference picture list for a particular video block. For example, if ref_pic_list_reordering_flag equals "0," then video decoder 30 is instructed to not reorder its constructed reference picture list.

If ref_pic_list_reordering_flag equals "1," then video decoder 30 is instructed to reorder its constructed single reference picture list. To reconstruct its single reference picture list, video decoder 30 expects to decode the reordering_of_pic_nums_idc, which is a variable whose value instructs the manner in which video decoder 30 should reorder its single reference picture list. In some examples, when ref_pic_list_reordering_flag is equal to "1," the number of times that reordering_of_pic_nums_idc is not equal to three following ref_pic_list_reordering_flag may not exceed num_ref_idx_active_minus1+1.

In general, the reordering syntax elements may define whether the reordered reference picture lists are short term reference pictures of single reference picture list 66, long term reference picture of single reference picture list 66, and how the reference pictures are reordered. For example, the syntax elements may define an offset from the picture of the predictive block in the case of short term reference picture reordering, and may assign a new index number to the picture in the case of long term reference picture reordering.

Table 6 provides pseudo-code for a video block with which video decoder 30 may decode the video block. In the example pseudo-code of table 6, motion compensation unit 44 may not need to include syntax elements that indicate a particular type of inter-coded slice because video blocks of any inter-coded slice type are decoded based on the same, single reference picture list constructed on the video decoder 30 side. Motion compensation unit 44 may include syntax elements that indicate whether the video block is coded, e.g., predicted, using bi-prediction or uni-directional prediction. This may allow the video decoder 30 to determine whether it needs to wait for additional motion vector or index values before starting to decode the predicted video block.

For example, if the video block is bi-predicted, video decoder 30 may decode syntax elements for two motion vectors and index values for two reference pictures to decode the video block. If the video block is uni-directional predicted, video decoder 30 may know that it can decode the video block after decoding one motion vector information and one index value for the reference picture, which may facilitate processing efficiency. The syntax element that indicates whether the video block is coded using bi-prediction or uni-directional predication may facilitate such processing efficiency. Also, in the example pseudo-code of table 6, motion compensation unit 44 may not need to differentiate between different reference picture lists (e.g., conventional list 0 and list 1) because video decoder 30 uses only the single reference picture list to decode video blocks that are encoded with respect to one reference picture or two reference pictures.

TABLE 6

SYNTAX TABLE FOR A VIDEO BLOCK

| prediction_unit( x0, y0, currPredUnitSize ) { | C | Descriptor |
|---|---|---|
|     if( slice_type != I ) { | | |
|         skip_flag | | |
|         if (non_uni_predict_flag ) | | |
|             bi_pred_flag | | |
|     if( skip_flag ) { | | |
|         if( mv_competition_flag ) { | | |
|             mvp_idx_l0 | | |
|             if( bi_pred_flag ) | | |
|                 mvp_idx_l1 | | |
|         } | | |
|     if( pbic_flag ) { | | |
|      if( NumICPCand > 1 ) | | |
|      icp_idx | | |
|     } | | |
| } | | |
| else { | | |
|     if(!entropy_coding_mode_flag) | | |
|         mode_table_idx | | |
|     else { | | |
|     if( slice_type != I ) | | |
|         pred_mode | | |
|     } | | |
|     if( PredMode == MODE_INTRA ) { | | |
|         planar_flag | | |
|         if(planar_flag) { | | |
|             planar_delta_y = getPlanarDelta( ) | | |
|             planar_delta_uv_present_flag | | |
|             if(planar_delta_uv_present_flag) { | | |
|                 planar_delta_u = getPlanarDelta( ) | | |
|                 planar_delta_v = getPlanarDelta( ) | | |
|             } | | |
|         } else { | | |
|             if(entropy_coding_mode_flag) | | |
|                 intra_split_flag | | |
|             combined_intra_pred_flag | | |
|             for( i = 0; i < ( intra_split_flag ? 4 : 1 ); i++ ) { | | |
|                 prev_intra_luma_pred_flag | | |
|     if( slice_type != I ) { | | |
|         skip_flag | | |
|         if (non_uni_predict_flag ) | | |
|             bi_pred_flag | | |

TABLE 6-continued

SYNTAX TABLE FOR A VIDEO BLOCK

| prediction_unit( x0, y0, currPredUnitSize ) { | C | Descriptor |
|---|---|---|
|   if( skip_flag ) { | | |
|     if( mv_competition_flag ) { | | |
|       mvp_idx_l0 | 2 | ue(v) \| ae(v) |
|       if( bi_pred_flag ) | | |
|         mvp_idx_l1 | 2 | ue(v) \| ae(v) |
|     } | | |
|   if( pbic_flag ) { | | |
|    if( NumICPCand > 1 ) | | |
|     icp_idx | 2 | ue(v) \| ae(v) |
|   } | | |
| } | | |
| else { | | |
|   if(!entropy_coding_mode_flag) | | |
|     mode_table_idx | | vlc(n, v) |
|   else { | | |
|   if( slice_type != I ) | | |
|     pred_mode | 2 | u(1) \| ae(v) |
|   } | | |
|   if( PredMode == MODE_INTRA ) { | | |
|     planar_flag | 2 | u(1) \| ae(v) |
|     if(planar_flag) { | | |
|       planar_delta_y = getPlanarDelta( ) | | |
|       planar_delta_uv_present_flag | 2 | u(1) \| ae(v) |
|       if(planar_delta_uv_present_flag) { | | |
|         planar_delta_u = getPlanarDelta( ) | | |
|         planar_delta_v = getPlanarDelta( ) | | |
|       } | | |
|     } else { | | |
|       if(entropy_coding_mode_flag) | | |
|         intra_split_flag | 2 | ae(v) |
|       combined_intra_pred_flag | 2 | u(1) \| ae(v) |
|       for( i = 0; i < ( intra_split_flag ? 4 : 1 ); i++ ) { | | |
|         prev_intra_luma_pred_flag | 2 | u(1) \| ae(v) |
|         if( !prev_intra_pred_luma_flag ) | | |
|           rem_intra_luma_pred_mode | 2 | ue(v) \| ae(v) |
|         if( adaptive_intra_smoothing_flag ) | | |
|           intra_luma_filt_flag | 2 | u(1) \| ae(v) |
|       } | | |
|     } | | |
|     if( chroma_format_idc != 0 ) | | |
|       intra_chroma_pred_mode | 2 | ue(v) \| ae(v) |
|     } | | |
|   } | | |
|   else if( PredMode == MODE_INTER ) { | | |
|     if(entropy_coding_mode_flag) | | |
|       inter_partitioning_idc | 2 | ue(v) \| ae(v) |
|     for( i= 0; i < NumPuParts( inter_partitioning_idc ); i++ ) { | | |
|       if( NumMergeCandidates > 0 ) { | | |
|         merge_flag[ i ] | 2 | ue(1) \| ae(v) |
|         if( merge_flag[ i ] && NumMergeCandidates > 1 ) | | |
|           merge_left_flag[ i ] | 2 | ue(1) \| ae(v) |
|       } | | |
|       if( !merge_flag[i] ) { | | |
|         if( entropy_coding_mode_flag ) { | | |
|           if( num_ref_idx_active_minus1 > 0 ) | | |
|             ref_idx_l0[i] | 2 | ue(v) \| ae(v) |
|      if ( !pbic_flag ) | | |
|         mvres_l0 [ i ] | 2 | ue(1) \| ae(v) |
|       } | | |
|       else { | | |
|         ref_idx_mvres_l0[ i ] | 2 | ue(v) \| ae(v) |
|       } | | |
|       if ( !pbic_flag ) { | | |
|         mvd_l0[ i ][ 0 ] | 2 | se(v) \| ae(v) |
|         mvd_l0[ i ][ 1 ] | 2 | se(v) \| ae(v) |
|         if( mv_competition_flag && | | |
|           NumMVPCand( L0, i ) > 1 ) | | |
|           mvp_idx_l0[ i ] | 2 | ue(v) \| ae(v) |
|       } | | |
|       } | | |
|       if( bi_pred_flag) { | | |
|     if( entropy_coding_mode_flag ) { | | |
|       if(num_ref_idx_1_active_minus 1 > 1) | | |
|         ref_idx_l1[ i ] | 2 | ue(v) \| ae(v) |

TABLE 6-continued

SYNTAX TABLE FOR A VIDEO BLOCK

| prediction_unit( x0, y0, currPredUnitSize ) { | C | Descriptor |
|---|---|---|
|     if( !pbic_flag ) | | |
|         mvres_l1 [ i ] | 2 | ue(1) \| ae(v) |
|     } | | |
|     else { | | |
|         ref_idx_mvres_l1[ i ] | 2 | ue(v) \| ae(v) |
|     } | | |
|     if( !pbic_flag ) { | | |
|         mvd_l1[ i ][ 0 ] | 2 | se(v) \| ae(v) |
|         mvd_l1[ i ][ 1 ] | 2 | se(v) \| ae(v) |
|         if( mv_competition_flag && | | |
|             NumMVPCand( L1, i ) > 1 ) | | |
|             mvp_idx_l1[ i ] | 2 | ue(v) \| ae(v) |
|     } | | |
|     } | | |
|     else if( PredMode == MODE_DIRECT ) { | | |
|         if( mv_competition_flag ) { | | |
|             mvp_idx_l0 | 2 | ue(v) \| ae(v) |
|         if(bi_pred_flag) | | |
|             mvp_idx_l1 | 2 | ue(v) \| ae(v) |
|         } | | |
|     } | | |
| } | | |

In the example pseudo-code of table 6, the bi_pred_flag may indicate whether a current video block is uni-directionally predicted or bi-predicted. In other words, the bi_pred_flag may be a syntax element that indicates whether a video block is coded using bi-prediction or uni-directional prediction. For example, if bi_pred_flag is equal to "1," then the current video block is bi-predictive coded (e.g., coded with respect to two reference pictures). In this case, video decoder 30 expects to decode information for two motion vectors. If bi_pred_flag is equal to "0," then the current video block is uni-directionally predictive. In this case, video decoder 30 expects to decode information for only one motion vector, and may not need to wait on another motion vector before decoding the video block.

The bi_pred_flag, in conjunction with the techniques described in this disclosure, may enable reduction in the amount of information that needs to be signaled as compared to conventional techniques. For instance, in conventional techniques the video encoder would signal a flag that indicates whether a video block is bi-predicted to uni-directionally predicted, and when uni-directionally predicted, the video encoder would signal whether the video block is predicted from reference pictures in the conventional List 0 or List 1. In one or more examples techniques described in this disclosure, when the bi_pred_flag is equal to "0," to indicate that the video block is uni-directionally predicted, video encoder 20 may not need to signal information indicating which picture list includes the identifier for the picture that was used to predict the video block because only a single reference picture list (rather than the conventional List 0 and List 1) may be needed to predict the video block.

After motion compensation unit 44 generates the predictive block for the current video block, video encoder 20 forms a residual video block by subtracting the predictive block from the current video block. Transform unit 52 may form one or more transform units (TUs) from the residual block. Transform unit 52 applies a transform, such as a discrete cosine transform (DCT) or a conceptually similar transform, to the TU, producing a video block comprising residual transform coefficients. The transform may convert the residual block from a pixel domain to a transform domain, such as a frequency domain.

Transform unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), or another entropy encoding technique. Following the entropy encoding by entropy encoding unit 56, the encoded bitstream may be transmitted to a video decoder, such as video decoder 30, or archived for later transmission or retrieval.

Entropy encoding unit 56 may also entropy encode the motion vectors and the other prediction syntax elements for the current video picture being coded. For example, entropy encoding unit 56 may construct header information that includes appropriate syntax elements generated by motion compensation unit 44 for transmission in the encoded bitstream. To entropy encode the syntax elements, entropy encoding unit 56 may perform CABAC and binarize the syntax elements into one or more binary bits based on a context model. Entropy encoding unit may also perform CAVLC and encode the syntax elements as codewords according to probabilities based on context.

In some examples, where a video block is predicted from two reference pictures, entropy encoding unit 56 may encode the motion vector that points to one of the reference pictures based on the motion vector that points to the other reference picture. Entropy encoding unit 56 may also encode information that indicates where one of the reference pictures is located in the single reference picture list construed by video decoder 30 based on the information that indicates where the other reference picture is located in the single reference picture list constructed by video decoder 30. However, entropy encoding unit 56 may not need to perform such encoding in every example, and such encoding is provided for illustration purposes only.

Inverse quantization unit 58 and inverse transform unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within single reference picture list 66. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video picture.

Figure 4:
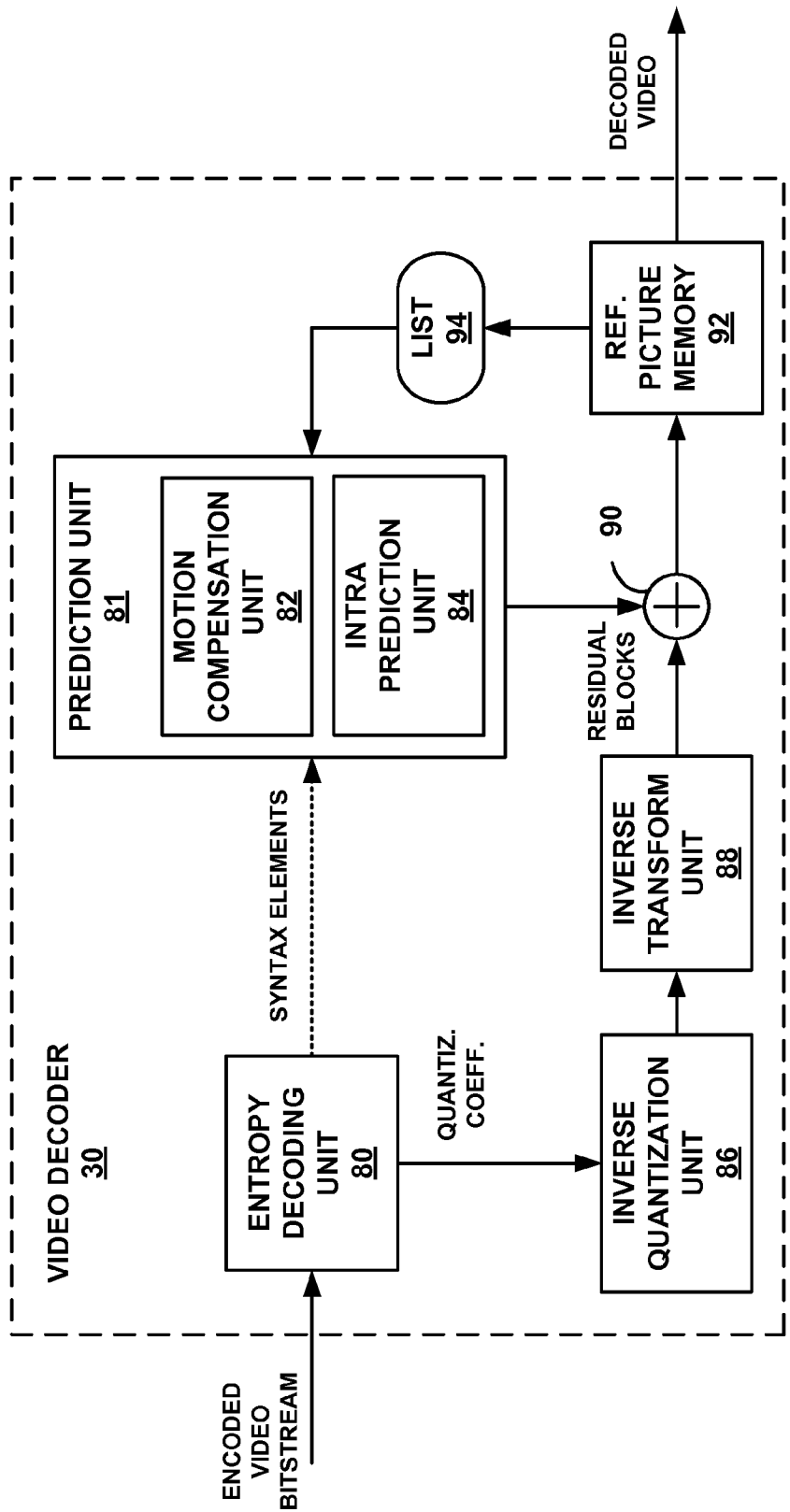
FIG. 4 is a block diagram illustrating an example video decoder that may implement techniques in accordance with one or more aspects of this disclosure.

FIG. 4 is a block diagram illustrating an example video decoder that may implement techniques in accordance with one or more aspects of this disclosure. In the example of FIG. 4, video decoder 30 includes an entropy decoding unit 80, prediction unit 81, inverse quantization unit 86, inverse transformation unit 88, summer 90, and reference picture memory 92. Prediction unit 81 includes motion compensation unit 82 and intra prediction unit 84. Video decoder 30 may, in some examples, perform a decoding pass generally reciprocal to the encoding pass described with respect to video encoder 20 (FIG. 3).

During the decoding process, video decoder 30 receives an encoded video bitstream that includes an encoded video block and syntax elements that represent coding information from a video encoder, such as video encoder 20. Entropy decoding unit 80 of video decoder 30 entropy decodes the bitstream to generate quantized coefficients, motion vectors, and other prediction syntax. Entropy decoding unit 80 forwards the motion vectors and other prediction syntax to prediction unit 81. Video decoder 30 may receive the syntax elements at the video prediction unit level, the video coding unit level, the video slice level, the video picture level, and/or the video sequence level.

When the video slice is coded as an intra-coded (I) slice, intra prediction unit 84 of prediction unit 81 may generate prediction data for a video block of the current video picture based on a signaled intra prediction mode and data from previously decoded blocks of the current picture. When the video block is inter-predicted, motion compensation unit 82 of prediction unit 81 produces predictive blocks for a video block of the current video picture based on the motion vector or vectors and prediction syntax received from entropy decoding unit 80. The predictive blocks may be produced from single reference picture 94. Single reference picture list 94 may be constructed based on reference pictures stored in reference picture memory 92. As described above, in the examples techniques, motion compensation unit 82 may decode a video block of any type using the same single reference picture list 94, and may not need to use any other reference picture list. Also, motion compensation unit 82 may decode a video block using the same single reference picture list regardless of whether the video block is encoded with respect to one reference picture or two reference pictures.

Motion compensation unit 82 determines prediction information for the current video block by parsing the motion vectors and prediction syntax, and uses the prediction information to produce the predictive blocks for the current video block being decoded. For example, motion compensation unit 82 uses some of the received syntax elements to determine sizes of CUs used to encode the current picture, split information that describes how each CU of the picture is split, modes indicating how each split is encoded (e.g., intra- or inter-prediction), motion vectors for each inter-predicted video block of the picture, motion prediction direction for each inter-predicted video block of the picture, and other information to decode the current video picture.

Motion compensation unit 82 may also perform interpolation based on interpolation filters. Motion compensation unit 82 may use interpolation filters as used by video encoder 20 during encoding of the video block to calculate interpolated values for sub-integer pixels of a reference block. Motion compensation unit 82 may determine the interpolation filters used by video encoder 20 from the received syntax elements and use the interpolation filters to produce predictive blocks.

In accordance with the techniques of this disclosure, video decoder 30 may reduce a cost of coding video blocks by constructing only single reference picture list 94. For example, video decoder 30 may implement the default construction techniques to construct single reference picture list 94. Also, video decoder 30 may not need to construct any other reference picture list. Video decoder 30 may implement the same default construction techniques that video encoder 20 implemented to construct single reference picture 66 of video encoder 20. Also, video decoder 30 may decode a video block that is inter-predicted using the reference pictures indicated in single reference picture list 94 regardless of the slice type that includes the video block, and regardless of whether the video block is uni-directionally predicted or bi-predicted (e.g., predicted from one reference picture or two reference pictures, respectively)

For instance, video decoder 30 may determine the temporal distance between a video block of a current picture and the one or more reference pictures stored in reference picture memory 92. The reference pictures stored in reference picture memory 92 may be previously decoded reference pictures. In one example, video decoder 30 may include identifiers of the reference pictures (e.g., POC values or picture number values) that are temporally closer to the current picture at earlier locations in single reference picture list 94 than identifiers of the reference pictures that are temporally further away from the current picture. In an alternate example, video decoder 30 may include identifiers of the reference pictures that are temporally further away from the current picture at earlier locations in single reference picture list 84 than identifiers of the reference pictures that are temporally closer to the current picture. The temporal distance between the current picture and the one or more reference pictures may be based on the absolute value of the difference between the POC value or picture number value of the current picture and the POC values or picture number values of the one or more reference pictures. In these examples, it may not be relevant whether a reference picture is temporally prior or temporally subsequent reference picture.

In instances where the temporal distance between two reference pictures and the current picture is the same, video decoder 30 may include the identifier for the reference picture with the smaller POC or picture number value at an earlier location of single reference picture list 94, and include the identifier for the reference picture with the larger POC value or picture number value at a later location in single reference picture list 94. In an alternate example, when the temporal distance between two reference pictures and the current picture is the same, video decoder 30 may include the identifier for the reference picture with the larger POC or picture number value in the earlier location in single reference picture list 94, and include the identifier for the reference picture with the smaller POC or picture number value at the later location in single reference picture list 94.

If the syntax elements decoded by entropy decoding unit 80 instructed video decoder 30 to reorder the identifiers in single reference picture list 94, video decoder may reorder single reference picture list 94. The received reordering syntax elements may instruct video decoder 30 in the manner in which video decoder 30 should reorder the identifiers of the reference pictures in single reference picture list 94, and video decoder 30 may reorder single reference picture list 94 as instructed.

The syntax elements decoded by entropy decoding unit 80 may include motion vector information and index values for the identifier of the reference pictures associated with the motion vector information. The index values may be index values of single reference picture list 94 that indicate where the identifier for the reference picture is located in single reference picture list 94. Entropy decoding unit 80 may not need to decode index values for any other reference picture list other than single reference picture list 94 because there may be no need to utilize any other reference picture list for decoding.

With the index values, motion compensation unit 82 may identify the reference picture or pictures that it should use to decode a video block from single reference picture list 94, and retrieve those reference picture or pictures from reference picture memory 92. The motion vector information indicates to motion compensation unit 82 which block or blocks of the reference picture or pictures it should utilize to decode the video block. Motion compensation unit 82 may then generate the predictive block for eventually decoding the video block.

As an illustrative example, entropy decoding unit 80 may decode information to decode a current video block, which may be encoded with respect to one reference picture (e.g., uni-directionally predicted) or with respect to two reference pictures (e.g., bi-predicted). In this example, assume that the current video block is encoded with respect to two reference pictures. The decoded information may indicate the index values for where the identifiers for the two reference pictures are located in single reference picture list 94 as well as motion vector information that indicates where the matching blocks, which match the current video block, are located in the two reference pictures.

Motion compensation unit 82 may then determine the identifiers for the two reference pictures stored within single reference picture list 94 based on the index values. Motion compensation unit 82 may receive the reference pictures from reference picture memory 92 based on the determined identifiers. Motion compensation unit 82 may then decode the current video block based on the reference pictures and the motion vector information.

As another illustrative example, assume that the current video block is only encoded with respect to one reference picture. In this example, the decoded information may indicate the index value for the only one reference picture and the motion vector for the only one reference picture. Motion compensation unit 82 may then decode the current video block similar to the previous example; however, motion compensation unit 82 may utilize only one reference picture to decode the current video block.

In either of the above illustrative examples, it may be immaterial whether a the video block is part of a P-slice, B-slice, or GPB-slice because motion compensation unit 82 can decode the video block based only on the reference pictures indicated in single reference picture list 94. In conventional techniques, motion compensation unit 82 required two different lists, and also required an indication as to whether a video block is part of a P-slice, B-slice, or GPB-slice so that motion compensation unit 82 would know which of the two lists to use.

Also, in either of the above illustrative examples, it may be immaterial whether the video block is encoded with respect to one reference picture or two reference pictures. Motion compensation unit 82 uses only single reference picture list 94 to determine which reference picture was utilized to encode a video block, when that video block is encoded with respect to one reference picture. Motion compensation unit 82 also uses the same single reference picture list 94 to determine which reference pictures were utilized to encode a video block, when that video block is encoded with respect to two reference pictures. In other words, the decoded index values, which motion compensation unit 82 uses to determine which reference picture or pictures are to use for decoding, may be only for single reference picture list 94, and for no other reference picture list, in these examples.

Video decoder 30 may also apply prediction weights and offsets to reference pictures in single reference picture list 94 using the syntax elements indicating weight and offset values of the reference pictures. The syntax elements representing prediction weights and offsets may comprise a table that instructs decoder 30 to apply certain weight and offset values to each reference picture of single reference picture list 94.

Inverse quantization unit 86 inverse quantizes, i.e., de-quantizes, the quantized transform coefficients provided in the bitstream and decoded by entropy decoding unit 80. The inverse quantization process may include use of a quantization parameter $QP_Y$ calculated by video encoder 20 for each video block or CU to determine a degree of quantization and, likewise, a degree of inverse quantization that should be applied. Inverse transform unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and prediction syntax elements, video decoder 30 forms a decoded video block by summing the residual blocks from inverse transform unit 88 with the corresponding predictive blocks generated by motion compensation unit 82. Summer 90 represents the component or components that perform this summation operation. If desired, a deblocking filter may also be applied to filter the decoded blocks in order to remove blockiness artifacts. The decoded video blocks are then stored in reference picture memory 92, which provides reference blocks of reference pictures for subsequent motion compensation. Reference picture memory 92 also produces decoded video for presentation on a display device, such as display device 32 of FIG. 1.

In some examples, entropy decoding unit 80 may also decode syntax elements that indicate whether encoding for a video block, video slice, video picture, or group of pictures is constrained to uni-directional prediction (e.g., with the uni_pred_only_flag). The uni_pred_only syntax element may increase the computation efficiency of motion compensation unit 82. For instance, when the uni_pred_only syntax element is true, motion compensation unit 82 may become knowledgeable that it does not need to wait for two different index values to determine which reference pictures it should use for decoding. Rather, motion compensation unit 82 may being the decoding of a current video block immediately after receiving the index value and motion vector information for a single reference picture when the uni_pred_only syntax element is true.

Figure 5:
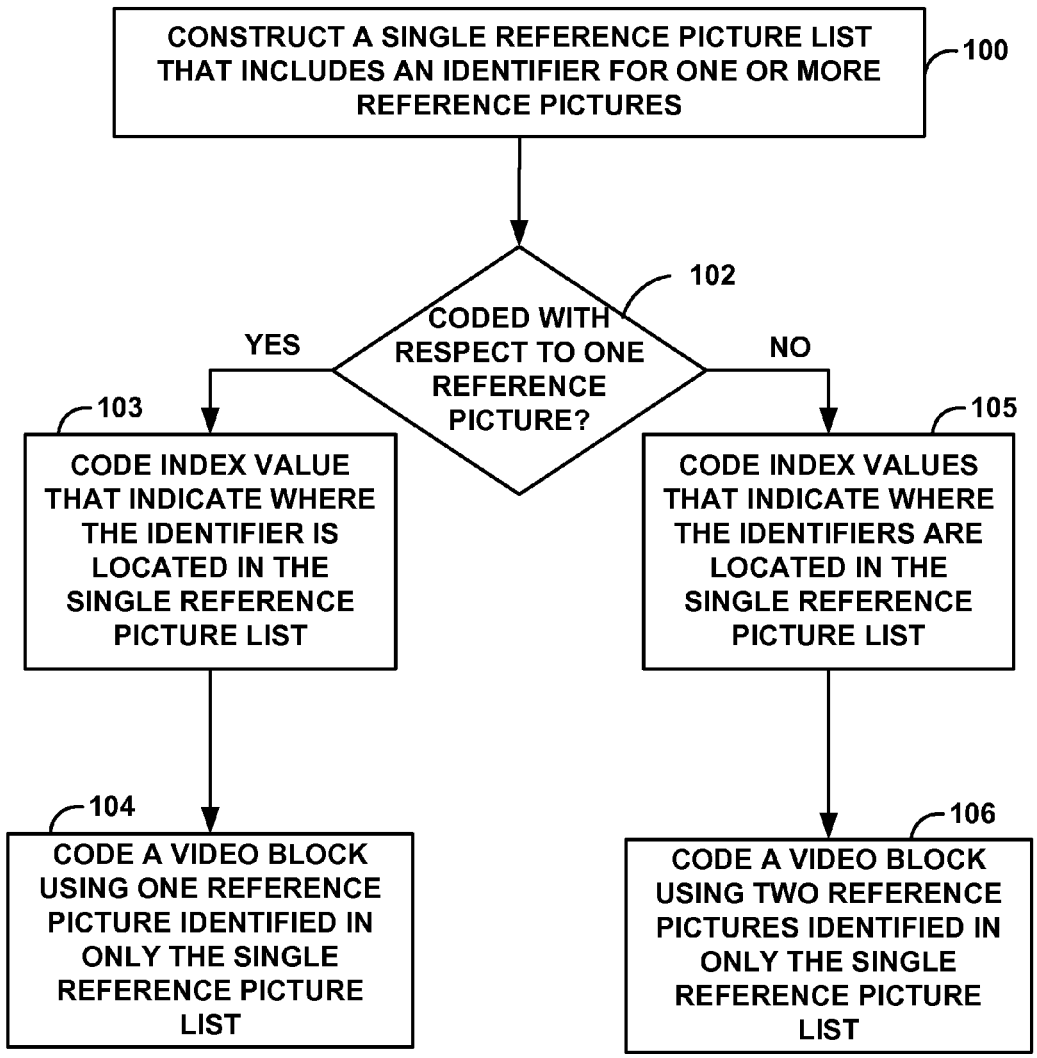
FIG. 5 is a flowchart illustrating an example operation of coding a video block in accordance with one or more aspects of this disclosure

FIG. 5 is a flowchart illustrating an example operation of coding a video block in accordance with one or more aspects of this disclosure. For ease of understanding, the flowchart of FIG. 5 refers to a video coder. The term "video coder" may be a common reference to video encoder 20 or video decoder 30. In other words, the functions illustrated in the flowchart of FIG. 5 may be performed by either video encoder 20 or video decoder 30, or both video encoder 20 and video decoder 30. Also, the term "code" as used in FIG. 5 refers to encoding when the video coder corresponds to video encoder 20 and decoding when the video coder corresponds to video decoder 30.

The video coder may construct a single reference picture list that includes an identifier for one or more reference pictures (100). In some examples, video coder may store the one or more reference pictures in memory of the video coding device (e.g., source device 12 or destination device 14), or within the video coder (e.g., reference picture memory 64 or reference picture memory 92). The video coder may implement the default construction technique to construct the single reference picture list as described above and further illustrated in FIGS. 6 and 7. In some examples, the video coder may not construct any other reference picture list other than the single reference picture list (e.g., other than single reference picture list 66 or single reference picture list 94).

The video coder may determine whether a video block is coded with respect to one reference picture (102). From example, video encoder 20 may determine whether a video block of a P-slice, B-slice, or GPB-slice is to be encoded with respect to only one reference picture, or whether a video block of a B-slice or GPB-slice is to be encoded with respect to two reference pictures. Similarly, video decoder 30 may determine whether a video block of a P-slice, B-slice, or GPB-slice is to be decoded with respect to only one reference picture, or whether a video block of a B-slice or GPB-slice is to be decoded with respect to two reference pictures.

When coded with respect to two reference pictures (NO branch of 102), the video coder may code index values that indicate where the identifiers are located in the single reference picture list (105). For example, when the video block is coded with respect to two different reference pictures, video decoder 30 may decode the index values that indicate where the identifiers for each of the reference pictures are stored in the signal reference pictures list 94. The video coder may not code index values for any other reference picture list. Again, the identifiers for reference pictures stored in the single reference picture list constructed by the video coder may be sufficient to identify all of the reference pictures that may be needed to code a video block of a current picture. The video coder may code a video block of a current picture using at least two reference pictures identified in only the single reference picture list (106).

When coded with respect to only one reference picture (YES branch of 102), the video coder may code an index value that indicates where the identifier is located in the single reference picture list (103). For example, when the video block is coded with respect to one reference picture, video decoder 30 may decode the index value that indicates where the identifier for the reference picture used to predict the video block is stored in the signal reference pictures list 94. The video coder may not code index values for any other reference picture list. The video coder may code the video block of the current picture using one of the reference pictures identified in only the single reference picture list (104).

For example, in either situation (e.g., block 104 or block 106 in FIG. 5), the video coder may not need to code the video block using the conventional list 0 and list 1, or a list 0 and a duplicate of list 0. Rather, the single reference picture list may suffice in providing the identifier for the reference picture when the video block is coded with respect to only one reference picture, and suffice in providing the identifiers for the reference pictures when the video block is coded with respect to two different reference pictures. Also, when coded with respect to two reference pictures, the two reference pictures may be all temporally prior to, all temporally subsequent to, and both temporally prior to and temporally subsequent to the current picture in display order. In this way, it may be immaterial whether the video block is a video block of a P-slice, B-slice, or GPB-slice.

Figure 6:
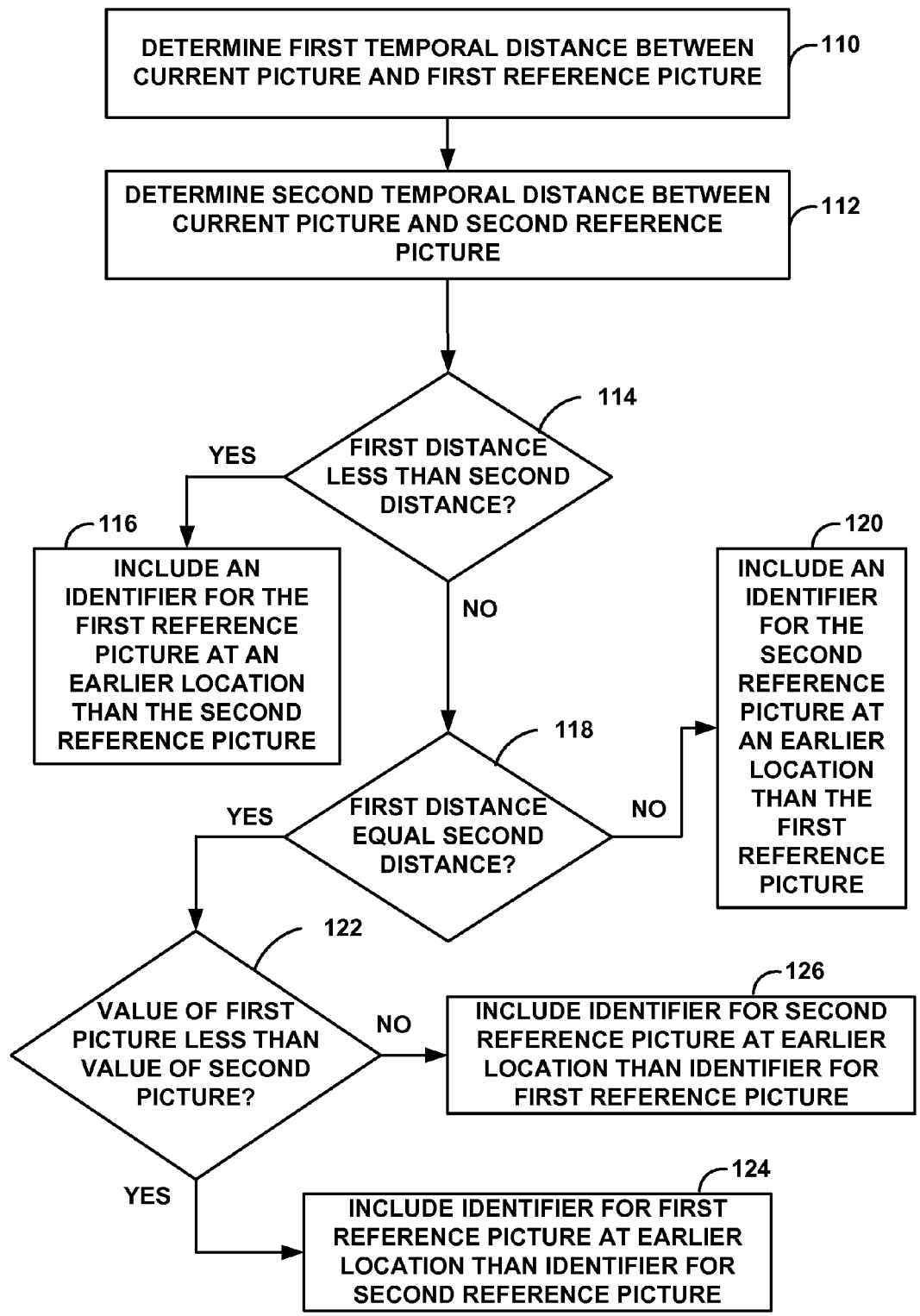
FIGS. 6 and 7 are flowcharts illustrating example operations for implementing a default construction technique to construct a single reference picture list in accordance with one or more aspects of this disclosure.
Figure 7:
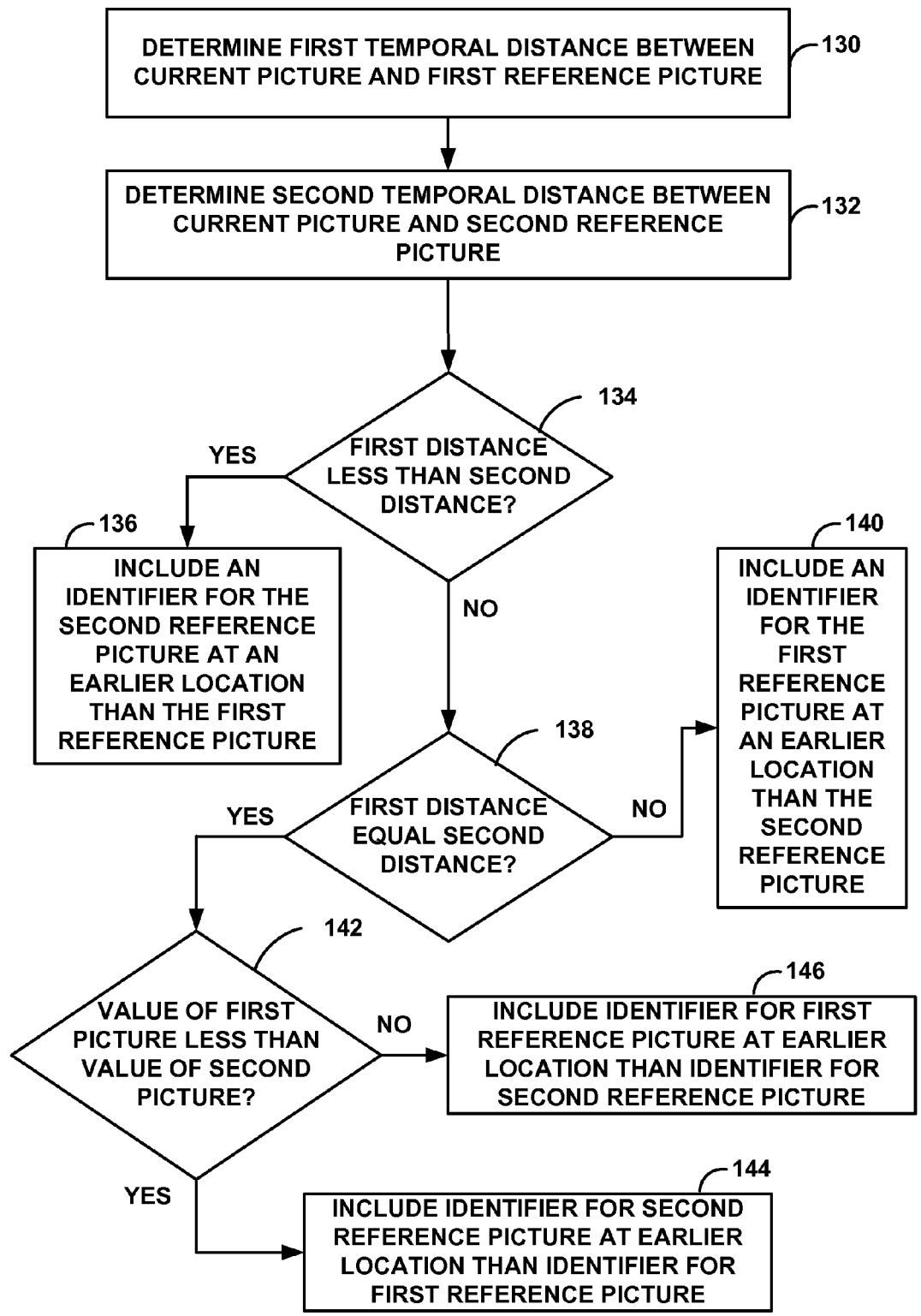

FIGS. 6 and 7 are flowcharts illustrating example operations for implementing a default construction technique to construct a single reference picture list in accordance with one or more aspects of this disclosure. Similar to FIG. 5, the flowchart of FIGS. 6 and 7 are described with reference to a video coder. Examples of the video coder include video encoder 20 and video decoder 30. In general, in the examples of FIGS. 6 and 7, the video coder may construct the single reference picture list based on distances between a current picture that includes the coded video block and each of the reference pictures included in the single reference picture list.

In the example of FIG. 6, the video coder may order the reference pictures in the single reference picture list in ascending order. For example, the video coder may include identifiers for reference pictures that are closer in display order or coding order to the current picture earlier in locations in the single reference picture list than reference pictures that are further away in display order or coding order from the current picture.

For example, the video coder may determine a first temporal distance between the current picture and a first reference picture (110), and determine a second temporal distance between the current picture and a second reference picture (112). To determine the temporal distances, the video coder may determine the absolute value of a difference between POC or picture number values of the current picture and the first picture and a difference between POC or picture number values of the current picture and the second picture.

The video coder may determine whether the first temporal distance is less than the second temporal distance (114). When the first temporal distance is less than the second temporal distance (YES branch of 114), the video coder may include an identifier for the first reference picture at an earlier location in the single reference picture list, and include an identifier for the second reference picture at a later location in the single reference picture list (116).

When the first temporal distance is not less than the second temporal distance (NO branch of 114), the video coder may determine whether the first temporal distance is equal to the second temporal distance (118). In this case, when the first temporal distance is not equal to the second temporal distance (NO branch of 118), the second temporal distance is less than the first temporal distance. When the second temporal distance is less than the first temporal distance, the video coder may include the identifier for the second reference picture in the earlier location in the single reference picture list, and include the identifier for the first reference picture at the later location in the single reference picture list (120).

When the first temporal distance is equal to the second temporal distance (YES branch of 118), the video coder may determine whether the first reference picture is earlier in display order or coding order than the second reference picture based on their respective POC or picture number values (122). When the first reference picture is earlier in display order or coding order than the second reference picture (YES branch of 122), the video coder may include the identifier for the first reference picture at an earlier location in the single reference picture list than the identifier for the second reference picture (124). When the second reference picture is earlier in display order or coding order than the first reference picture (NO branch of 122), the video coder may include the identifier for the second reference picture at an earlier location in the single reference picture list than the identifier for the first reference picture (126).

In the example of FIG. 7, the video coder may order the reference pictures in the single reference picture list in descending order. For example, the video coder may include identifiers for reference pictures that are further away in display order or coding order from the current picture earlier in locations in the single reference picture list than reference pictures that are closer in display order or coding order to the current picture. For example, similar to FIG. 6, the video coder may determine a first temporal distance between the current picture and a first reference picture (130), and determine a second temporal distance between the current picture and a second reference picture (132).

The video coder may determine whether the first temporal distance is less than the second temporal distance (134). When the first temporal distance is less than the second temporal distance (YES branch of 134), the video coder may include an identifier for the second reference picture at an earlier location the single reference picture list, and include an identifier for the first reference picture at a later location in the single reference picture list (136).

When the first temporal distance is not less than the second temporal distance (NO branch of 134), the video coder may determine whether the first temporal distance is equal to the second temporal distance (138). In this case, when the first temporal distance is not equal to the second temporal distance (NO branch of 138), the second temporal distance is less than the first temporal distance. When the second temporal distance is less than the first temporal distance, the video coder may include the identifier for the first reference picture in the earlier location in the single reference picture list, and include the identifier for the second reference picture at the later location in the single reference picture list (140).

When the first temporal distance is equal to the second temporal distance (YES branch of 138), the video coder may determine whether the first reference picture is earlier in display order or coding order than the second reference picture based on their respective POC or picture number values (142). When the first reference picture is earlier in display order or coding order than the second reference picture (YES branch of 142), the video coder may include the identifier for the second reference picture at an earlier location in the single reference picture list than the identifier for the first reference picture (144). When the second reference picture is earlier in display order than the first reference picture (NO branch of 142), the video coder may include the identifier for the first reference picture at an earlier location in the single reference picture list than the identifier for the second reference picture (146).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of coding video data comprising:
constructing, with a video coder, a single reference picture list that includes an identifier for each of one or more reference pictures from a memory that stores decoded reference pictures, wherein the single reference picture list, and no other reference picture list, is utilized to code a bi-predicted video block, and the same single reference picture list is utilized to code a uni-directionally predicted video block;
coding, with the video coder, one index value of the single reference picture list if a video block of a current picture is uni-directionally predicted and two index values of the single reference picture list if the video block of the current picture is bi-predicted; and
coding, with the video coder, the video block of the current picture using the single reference picture list, and no other reference picture list, wherein, when the video block is bi-predicted, the video block is coded with respect to two of the reference pictures identified in the single reference picture list by the two index values, and, when the video block is uni-directionally predicted, the video block is coded with respect to one of the reference pictures identified in the same single reference picture list by the one index value.

2. The method of claim 1, further comprising:
coding one or more syntax elements that indicate whether the video block is coded using bi-prediction or uni-directional prediction.

3. The method of claim 1, wherein the one or more reference pictures identified in the single reference picture list comprise one of reference pictures that are all temporally prior to the current video picture, all temporally subsequent to the current video picture, or both temporally prior to and temporally subsequent to the current video picture in display order.

4. The method of claim 1, wherein coding the video block of the current picture comprises decoding the video block of the current picture, further comprising:
decoding index values that indicate where the two reference pictures are located within the single reference picture list when the current picture is coded using bi-prediction, without decoding coding index values for reference pictures in any other reference picture list.

5. The method of claim 1, wherein constructing the single reference picture list comprises constructing the single reference picture list without constructing any other reference picture list.

6. The method of claim 1, wherein constructing the single reference picture list comprises constructing the single reference picture list based on temporal distances between the current picture and each of the reference pictures that is to be included in the single reference picture list.

7. The method of claim 1, wherein constructing the single reference picture list comprises including identifiers for reference pictures that are closer in display order to the current picture at earlier locations in the single reference picture list than reference pictures that are further away in display order from the current picture.

8. The method of claim 1, wherein constructing the single reference picture list comprises:
determining a first temporal distance between the current picture and a first reference picture;
determining a second temporal distance between the current picture and a second reference picture;
when the first temporal distance is less than the second temporal distance, including an identifier for the first reference picture at an earlier location in the single reference picture list, and including an identifier for the second reference picture at a later location in the single reference picture list; and
when the second temporal distance is less than the first temporal distance, including the identifier for the second reference picture at the earlier location in the single reference picture list, and including the identifier for the first reference picture at the later location in the single reference picture list.

9. The method of claim 8, further comprising:
when the first temporal distance equals the second temporal distance:
determining whether the first reference picture is earlier in display order than the second reference picture;
when the first reference picture is earlier in display order than the second reference picture, including the identifier for the first reference picture at an earlier location in the single reference picture list than the identifier for the second reference picture; and
when the second reference picture is earlier in display order than the first reference picture, including the identifier for the second reference picture at an earlier location in the single reference picture list than the identifier for the first reference picture.

10. The method of claim 8, wherein determining the first temporal distance comprises determining an absolute value of a difference between picture order count values of the current picture and the first picture, and wherein determining the second temporal distance comprises determining an absolute value of a difference between picture order count values of the current picture and the second picture.

11. The method of claim 1, wherein constructing the single reference picture list comprises including identifiers for reference pictures that are further away in display order from the current picture at earlier locations in the single reference picture list than reference pictures that are closer in display order to the current picture.

12. The method of claim 1, wherein constructing the single reference picture list comprises:
determining a first temporal distance between the current picture and a first reference picture;
determining a second temporal distance between the current picture and a second reference picture;
when the first temporal distance is less than the second temporal distance, including an identifier for the second reference picture at an earlier location the single reference picture list, and including an identifier for the first reference picture at a later location in the single reference picture list; and
when the second temporal distance is less than the first temporal distance, including the identifier for the first reference picture at the earlier location in the single reference picture list, and including the identifier for the second reference picture at the later location in the single reference picture list.

13. The method of claim 12, further comprising:
when the first temporal distance equals the second temporal distance:
determining whether the first reference picture is earlier in display order than the second reference picture;
when the first reference picture is earlier in display order than the second picture, including the identifier for the second reference picture at an earlier location in the single reference picture list than the identifier for the first reference picture; and when the second reference picture is earlier in display order than the first reference picture, including the identifier for the first reference picture at an earlier location in the single reference picture list than the identifier for the second reference picture.

14. The method of claim 1, wherein the method comprises a method of video decoding further comprising:
decoding one or more syntax elements that indicate that coding is constrained to uni-directional prediction for all video blocks within at least one of a video sequence, a video picture, or a video slice; and
decoding the video block using uni-directional prediction with respect to one reference picture identified in the single reference picture list.

15. The method of claim 1, further comprising:
coding one or more syntax elements that indicate a number of video blocks within the current picture that are coded using bi-prediction with respect to two reference pictures in the single reference picture list.

16. The method of claim 1, further comprising:
coding one or more syntax elements that indicate an area of the current picture that is coded using bi-prediction with respect to two reference pictures in the single reference picture list.

17. A video coding device comprising:
a memory configured to store decoded reference pictures; and
a video coder configured to:
construct a single reference picture list that includes an identifier for each of one or more reference pictures stored in the memory, wherein the single reference picture list, and no other reference picture list, is utilized to code a bi-predicted video block, and the same single reference picture list is utilized to code a uni-directionally predicted video block;
code one index value of the single reference picture list if a video block of a current picture is uni-directionally predicted and two index values of the single reference picture list if the video block of the current picture is bi-predicted; and
code the video block of the current picture using the single reference picture list, and no other reference picture list, wherein, when the video block is bi-predicted, the video block is coded with respect to two of the reference pictures identified in the single reference picture list by the two index values, and, when the video block is uni-directionally predicted, the video block is coded with respect to one of the reference pictures identified in the same single reference picture list by the one index value.

18. The video coding device of claim 17, wherein the video coder is further configured to code one or more syntax elements that indicate whether the video block is coded using bi-prediction or uni-directional prediction.

19. The video coding device of claim 17, wherein the one or more reference pictures identified in the single reference picture list comprise one of reference pictures that are all temporally prior to the current video picture, all temporally subsequent to the current video picture, or both temporally prior to and temporally subsequent to the current video picture in display order.

20. The video coding device of claim 17, wherein the video coder comprises a video decoder that decodes the video block of the current picture, and wherein the video decoder is further configured to decode index values that indicate where the two reference pictures are located within the single reference picture list when the current picture is coded using bi-prediction, without coding index values for reference pictures in any other reference picture list.

21. The video coding device of claim 17, wherein the video coder is configured to construct the single reference picture list without being configured to construct any other reference picture list.

22. The video coding device of claim 17, wherein the video coder is configured to construct the single reference picture list based on temporal distances between the current picture and each of the reference pictures that is to be included in the single reference picture list.

23. The video coding device of claim 17, wherein the video coder is configured to include identifiers for reference pictures that are closer in display order to the current picture at earlier locations in the single reference picture list than reference pictures that are further away in display order from the current picture.

24. The video coding device of claim 17, wherein to construct the single reference picture list, the video coder is configured to:
determine a first temporal distance between the current picture and a first reference picture;
determine a second temporal distance between the current picture and a second reference picture;
when the first temporal distance is less than the second temporal distance, include an identifier for the first reference picture at an earlier location in the single reference picture list, and include an identifier for the second reference picture at a later location in the single reference picture list; and
when the second temporal distance is less than the first temporal distance, include the identifier for the second reference picture at the earlier location in the single reference picture list, and include the identifier for the first reference picture at the later location in the single reference picture list.

25. The video coding device of claim 24, wherein, when the first temporal distance equals the second temporal distance, the video coder is configured to:
determine whether the first reference picture is earlier in display order than the second reference picture;
when the first reference picture is earlier in display order than the second reference picture, include the identifier for the first reference picture at an earlier location in the single reference picture list than the identifier for the second reference picture; and
when the second reference picture is earlier in display order than the first reference picture, include the identifier for the second reference picture at an earlier location in the single reference picture list than the identifier for the first reference picture.

26. The video coding device of claim 24, wherein the video coder is configured to determine an absolute value of a difference between picture order count values of the current picture and the first picture to determine the first temporal distance, and determine an absolute value of a difference between picture order count values of the current picture and the second picture to determine the second temporal distance.

27. The video coding device of claim 17, wherein the video coder is configured to include identifiers for reference pictures that are further away in display order from the current picture at earlier locations in the single reference picture list than reference pictures that are closer in display order to the current picture to construct the single reference picture list.

28. The video coding device of claim 17, wherein to construct the single reference picture list, the video coder is configured to:
- determine a first temporal distance between the current picture and a first reference picture;
- determine a second temporal distance between the current picture and a second reference picture;
- when the first temporal distance is less than the second temporal distance, include an identifier for the second reference picture at an earlier location the single reference picture list, and include an identifier for the first reference picture at a later location in the single reference picture list; and
- when the second temporal distance is less than the first temporal distance, include the identifier for the first reference picture at the earlier location in the single reference picture list, and include the identifier for the second reference picture at the later location in the single reference picture list.

29. The video coding device of claim 28, wherein, when the first temporal distance equals the second temporal distance, the video coder is configured to:
- determine whether the first reference picture is earlier in display order than the second reference picture;
- when the first reference frame is earlier in display order than the second reference frame, include the identifier for the second reference picture at an earlier location in the single reference picture list than the identifier for the first reference picture; and
- when the second reference frame is earlier in display order than the first reference frame, include the identifier for the first reference picture at an earlier location in the single reference picture list than the identifier for the second reference picture.

30. The video coding device of claim 17, wherein the video coder comprises a video decoder, and wherein the video decoder is further configured to decode one or more syntax elements that indicate that coding is constrained to uni-directional prediction for all video blocks within at least one of a video sequence, a video picture, or a video slice, and decode the video block using uni-directional prediction with respect to one reference picture identified in the single reference picture list.

31. The video coding device of claim 17, wherein the video coder is further configured to code one or more syntax elements that indicate a number of video blocks within the current picture that are coded using bi-prediction with respect to two reference pictures in the single reference picture list.

32. The video coding device of claim 17, wherein the video coder is further configured to code one or more syntax elements that indicate an area of the current picture that is coded using bi-prediction with respect to two reference pictures in the single reference picture list.

33. The video coding device of claim 17, wherein the video coder comprises one of a video decoder or a video encoder.

34. A video coding device comprising:
- means for constructing a single reference picture list that includes an identifier for each of one or more reference pictures from a memory that stores decoded reference pictures, wherein the single reference picture list, and no other reference picture list, is utilized to code a bi-predicted video block, and the same single reference picture list is utilized to code a uni-directionally predicted video block;
- means for coding one index value of the single reference picture list if a video block of a current picture is uni-directionally predicted and two index values of the single reference picture list if the video block of the current picture is bi-predicted; and
- means for coding video block of the current picture using the single reference picture list, and no other reference picture list, wherein, when the video block is bi-predicted, the video block is coded with respect to two of the reference pictures identified in the single reference picture list by the two index values, and, when the video block is uni-directionally predicted, the video block is coded with respect to one of the reference pictures identified in the same single reference picture list by the one index value.

35. The video coding device of claim 34, further comprising:
- means for coding one or more syntax elements that indicate whether the video block is coded using bi-prediction or uni-directional prediction.

36. The video coding device of claim 34, wherein the means for constructing the single reference picture list comprises means for including identifiers for reference pictures that are closer in display order to the current picture at earlier locations in the single reference picture list than reference pictures that are further away in display order from the current picture.

37. The video coding device of claim 34, wherein the means for constructing the single reference picture list comprises means for including identifiers for reference pictures that are further away in display order from the current picture at earlier locations in the single reference picture list than reference pictures that are closer in display order to the current picture.

38. A non-transitory computer-readable storage medium comprising instructions for coding video data that, upon execution in a video coder, cause the video coder to:
- construct a single reference picture list that includes an identifier for each of one or more reference pictures from a memory that stores decoded reference pictures, wherein the single reference picture list, and no other reference picture list, is utilized to code a bi-predicted video block, and the same single reference picture list is utilized to code a uni-directionally predicted video block;
- code one index value of the single reference picture list if a video block of a current picture is uni-directionally predicted and two index values of the single reference picture list if the video block of the current picture is bi-predicted; and
- code the video block of the current picture using the single reference picture list, and no other reference picture list, wherein, when the video block is bi-predicted, the video block is coded with respect to two of the reference pictures identified in the single reference picture list by the two index values, and, when the video block is uni-directionally predicted, the video block is coded with respect to one of the reference pictures identified in the same single reference picture list by the one index value.

39. The non-transitory computer-readable storage medium of claim 38, further comprising instructions that cause the video coder to:
- code one or more syntax elements that indicate whether the video block is coded using bi-prediction or uni-directional prediction.

* * * * *